(12) United States Patent
Urushibata et al.

(10) Patent No.: US 8,564,997 B2
(45) Date of Patent: *Oct. 22, 2013

(54) MATRIX CONVERTER SPACE VECTOR MODULATION METHOD

(75) Inventors: Shota Urushibata, Odawara (JP); Yugo Tadano, Tokyo (JP)

(73) Assignee: Meidensha Corporation, Tokyo (JP)

( * ) Notice: Subject to any disclaimer, the term of this patent is extended or adjusted under 35 U.S.C. 154(b) by 588 days.

This patent is subject to a terminal disclaimer.

(21) Appl. No.: 12/527,974

(22) PCT Filed: Mar. 12, 2008

(86) PCT No.: PCT/JP2008/054481
§ 371 (c)(1),
(2), (4) Date: Aug. 20, 2009

(87) PCT Pub. No.: WO2008/126593
PCT Pub. Date: Oct. 23, 2008

(65) Prior Publication Data
US 2010/0149848 A1 Jun. 17, 2010

(30) Foreign Application Priority Data
Mar. 14, 2007 (JP) .................. 2007-065863

(51) Int. Cl.
*H02M 5/00* (2006.01)

(52) U.S. Cl.
USPC ........................................ 363/159

(58) Field of Classification Search
USPC .................. 363/39, 123, 157, 159, 163, 164; 307/105
See application file for complete search history.

(56) References Cited

U.S. PATENT DOCUMENTS

| 5,949,672 A | 9/1999 | Bernet |
| 6,014,017 A * | 1/2000 | Weinhold et al. ............. 323/207 |

(Continued)

FOREIGN PATENT DOCUMENTS

| EP | 2 031 746 A1 | 3/2009 |
| EP | 2 034 598 A1 | 3/2009 |
| WO | WO 2008/126591 A1 | 10/2008 |

OTHER PUBLICATIONS

Huber et al., "Space Vector Modulated Three-Phase to Three-Phase Matrix Converter with Input Power factor Correction", Transactions on Industry Applications, vol. 31, No. 6 (1995), pp. 1234-1246.

(Continued)

*Primary Examiner* — Jue Zhang
*Assistant Examiner* — Henry Lee, III
(74) *Attorney, Agent, or Firm* — Foley & Lardner LLP

(57) ABSTRACT

[Problem] To provide a space vector modulation method for a matrix converter which uses only one carrier for three phases when a carrier comparison is made.
[Means for solving problem] Provided is a matrix converter space vector modulation method in which bidirectional switches (SW1 through SW9) of a matrix converter (3) are PWM controlled in a space vector modulation from a multi-phase AC power source. Switching patterns for which virtual indirect space vectors are used are converted into switching patterns for which direct conversion space vectors constituted by five vectors are used. Any one of the converted switching patterns satisfying predetermined conditions is selected and duties of the five vectors of the selected switching pattern are calculated using duty relationship equations between the virtual indirect conversion space vectors and the direct conversion space vectors. Then, the matrix converter is PWM-controlled on a basis of the calculated duties.

10 Claims, 7 Drawing Sheets (a)

(b)

(56) References Cited

U.S. PATENT DOCUMENTS

| | | | |
|---|---|---|---|
| 6,088,246 A * | 7/2000 | Okuyama et al. | 363/41 |
| 6,118,932 A | 9/2000 | Maurio et al. | |
| 6,313,602 B1 * | 11/2001 | Arefeen et al. | 318/801 |
| 7,068,526 B2 * | 6/2006 | Yamanaka et al. | 363/98 |
| 7,176,658 B2 * | 2/2007 | Quazi et al. | 322/24 |
| 7,696,730 B2 * | 4/2010 | Tamai et al. | 323/217 |
| 7,701,740 B2 * | 4/2010 | Yamanaka | 363/149 |
| 7,881,087 B2 * | 2/2011 | Sakakibara | 363/159 |
| 2004/0232875 A1 * | 11/2004 | Youm | 318/801 |
| 2006/0192522 A1 * | 8/2006 | Kerkman et al. | 318/812 |
| 2010/0091534 A1 | 4/2010 | Tadano et al. | |

OTHER PUBLICATIONS

Tadano et al., "A Study Space Vector Modulation Method for Three-Phase to Three-Phase Matrix Converter" National Convention Record, IEE Japan, Industry Applications Society, vol. 1 (2006), pp. 1-481-1-485.

Ito et al., "An Analysis Method of AC-AC Direct Converters", IEICE Technical Report, vol. 97, No. 43 (1997), pp. 107-115.

Yamamoto et al., "Improvement of Pulse Pattern for Space Vector Modulated Matrix Converter", Papers on Technical Meeting on Semiconductor Power Converter, SPC, IEE Japan, vol. SPC-06, Nos. 147-166 (2006), pp. 77-83.

Shimada et al., "PWM Control of Three-Phase to Three-Phase Matrix Converter for Reducing Output Voltage Harmonics", Semiconductor power Conversion Study Circle, vol. SPC-05 (2005). pp. 13-18.

Takeshita et al., "Matrix Converter Control Using Direct AC/AC Conversion Approach to Reduce Output Voltage Harmonics", Electrical Engineering Society Paper Magazine D, vol. 126, No. 6 (2006), pp. 778-787 and Extended Summary.

Ishiguro et al., "Output Voltage Control Method of PWM-Controlled Cycloconverters with Space Vectors", The Transactions of the Institute of Electrical Engineers of Japan, vol. 110, No. 6 (1990), pp. 655-663.

Andou et al., "PWM Control of Three-Phase to Three-Phase Matrix Converter for Reducing Number of Commutations", Heisei 18 Annual Conference of the Institute of Electrical Engineers of Japan, Industry Applications Society, vol. 2006, No. 1 (2006), pp. I-91-I-96.

Tadano et al., USPTO Non-Final Office Action, 12/528,395, dated Jan. 26, 2012, (11 pgs.).

Tadano et al., USPTO Notice of Allowance 12/528,395 dated Jul. 18, 2012, (7 pgs.).

* cited by examiner

PRIOR ART

STT→RTT→RST→RRT→RRS
STT→RTT→RST→RSS→RRS
STT→SST→RST→RRT→RRS
STT→SST→RST→RSS→RRS
STT→SST→SSS→RSS→RRS

MATRIX CONVERTER SPACE VECTOR MODULATION METHOD

TECHNICAL FIELD

The present invention relates to an AC-AC direct conversion device (a matrix converter) configured to obtain a multi-phase output which is a conversion from a multi-phase alternating current power source into an arbitrary voltage or frequency and, particularly, relates to a space vector modulation method for representing space vectors whose magnitudes and phases are varied moment by moment at an input thereof and an output thereof, respectively, and for performing duty calculations with base vectors to be used selected.

BACKGROUND ART

Such a kind of matrix converter as conventionally present is a conversion device in which bidirectional switches using self-commutating semiconductor elements are changed at a high speed to convert a single phase or a multi-phase AC input into an electric power having an arbitrary voltage or frequency and configured as shown in FIG. 1

FIG. 1 shows a basic configuration of a three-phase/three-phase matrix converter. A three-phase AC power source 1 is connected to an arbitrary load 4 via an input filter section 2 constituted by reactors and capacitors and a semiconductor power conversion section 3 constituted by nine bidirectional switches (SW1 through SW9). Nine bidirectional switches SW1 through SW9 are constituted by 18 reverse blocking IGBTs, combinations of semiconductor elements such as ordinary IGBTs and diodes, or so forth. Although no bones of detailed configuration methods thereof are made, switching elements which are capable of being power supplied or power received in both directions constitute the above-described nine bidirectional switches.

It should be noted that, as shown in FIG. 1, power source three phases are RST phases and output three phases are UVW phases.

Non-patent documents 1 through 4 have conventionally described various space vector modulation methods for the matrix converters.

The AC-AC direct conversion device represented by the matrix converter is a combination form of a voltage source power converter in which a power source voltage is PWM controlled to generate an output voltage thereof and a current source power converter in which an output load current is deemed to be a current source and a PWM control causes a power source current thereof to be generated and is a direct power conversion device from the alternating current to the alternating current. In order to realize a simultaneous control for both of the power converters by the nine bidirectional switches, mutual controls are associated with each other (that is to say, a restriction condition such that instantaneous three-phase effective powers supplied and received between the input thereof and the output thereof needs to be coincident with each other is provided).

Next, the space vector of the matrix converter will, herein, be defined with the above-described matters taken into consideration. The output voltage of the matrix converter is generated from an AC power source voltage and the input current thereof is generated in the PWM method from an AC load current. Hence, as is different from the space vector of a generally available DC-AC conversion device (an inverter), an instantaneous space vector through the PWM control that can be generated by the matrix converter is fluctuated moment by moment. A fluctuation in the instantaneous space vector of the space vector of the output voltage side is dependent upon the phase and magnitude of the power source voltage which provides a base for chopping in the PWM method. The instantaneous space vector of the input current side is fluctuated in dependence upon the phase and magnitude of the output load current.

In addition, a switching pattern of the matrix converter is needed to give such restriction conditions that (1) a power source short-circuit does not occur and (2) a discontinuity of the load current does not occur. The above item (1) provides a purpose to prevent an excessive current breakage due to the power source shortage and the above item (2) provides a purpose to prevent an excessive voltage failure due to an energy stored in an inductance in an inductive load. With these conditions taken into consideration, the switching patterns of nine bidirectional switches SW1 through SW9 are limited to 27 kinds ($3^3$) of combinations.

If the 27-kind switching patterns are expanded on a stationary $\alpha\beta$ coordinate at the input side and the output side, these switching patterns can be expressed as Table 1.

TABLE 1

| Group | | State | MC I/O connect | | | MC switch ON state | | |
|---|---|---|---|---|---|---|---|---|
| | | | U | V | W | U | V | W |
| S1 | simple harmonic oscillation | 1 s1-1a | R | S | S | 1 | 5 | 8 |
| | | 2 s1-1b | S | R | R | 2 | 4 | 7 |
| | | 3 s1-2a | S | T | T | 2 | 6 | 9 |
| | | 4 s1-2b | T | S | S | 3 | 5 | 8 |
| | | 5 s1-3a | T | R | R | 3 | 4 | 7 |
| | | 6 s1-3b | R | T | T | 1 | 6 | 9 |
| S2 | simple harmonic oscillation | 7 s2-1a | S | R | S | 2 | 4 | 8 |
| | | 8 s2-1b | R | S | R | 1 | 5 | 7 |
| | | 9 s2-2a | T | S | T | 3 | 5 | 9 |
| | | 10 s2-2b | S | T | S | 2 | 6 | 8 |
| | | 11 s2-3a | R | T | R | 1 | 6 | 7 |
| | | 12 s2-3b | T | R | T | 3 | 4 | 9 |
| S3 | simple harmonic oscillation | 13 s3-1a | S | S | R | 2 | 5 | 7 |
| | | 14 s3-1b | R | R | S | 1 | 4 | 8 |
| | | 15 s3-2a | T | T | S | 3 | 6 | 8 |
| | | 16 s3-2b | S | S | T | 2 | 5 | 9 |
| | | 17 s3-3a | R | R | T | 1 | 4 | 9 |
| | | 18 s3-3b | T | T | R | 3 | 6 | 7 |
| R1 | counter-clockwise rotation | 19 r1-1 | R | S | T | 1 | 5 | 9 |
| | | 20 r1-2 | T | R | S | 3 | 4 | 8 |
| | | 21 r1-3 | S | T | R | 2 | 6 | 7 |
| R2 | clockwise rotation | 22 r2-1 | R | T | S | 1 | 6 | 8 |
| | | 23 r2-2 | S | R | T | 2 | 4 | 9 |
| | | 24 r2-3 | T | S | R | 3 | 5 | 7 |
| Z | null | 25 z1 | R | R | R | 1 | 4 | 7 |
| | | 26 z2 | S | S | S | 2 | 5 | 8 |
| | | 27 z3 | T | T | T | 3 | 6 | 9 |

In Table 1, the space vector is divided into six groups of: simple harmonic oscillation vectors S1 of simple harmonic oscillation vector groups, each vector with a direction of a phase angle of 30 degrees as a positive axis; simple harmonic oscillation vectors S2, each vector with the direction of the phase angle of 150 degrees as the positive axis; simple harmonic oscillation vectors S3, each vector with the direction of the phase angle of 270 degrees as the positive axis; rotation vectors R1, each vector having a maximum constant length and rotating in a counterclockwise direction; rotation vectors R2, each vector having the same constant length and rotating in a clockwise direction; and zero vectors Z, each vector being fixed on a center zero point of a hexagon. These respective base vectors are dependent upon phase θ of the input voltage. In other words, these respective base vectors are fluctuated in synchronization with an angular speed $\omega_i$ of the input voltage. In addition, a length of each base vector (a magnitude of a hexagon) corresponds to the magnitude of an input line voltage.

As described before, since the instantaneous space vectors are changed moment by moment, they are fluctuated in synchronization with the respective phases. When attention is paid to the direction of fluctuation of the instantaneous space vectors on the stationary αβ coordinate, 27 kinds of vectors can be classified into 18 kinds of simple harmonic oscillation vectors (respective six kinds on three axes and respective phase relationships are constant), six kinds of rotation vectors (three kinds in the clockwise direction, three kinds in the counterclockwise direction, and the respective magnitudes are constant), and remaining three kinds of zero vectors (invariable at a position of an origin).

Table 1 is an example of the classification of 27-kind patterns with an output side space vector as a reference. Such a basic concept of the space vector as described above is well known from non-patent document 4 or so forth.

Non-patent documents 1 and 2 describe a method directly considering states of the input three-phase voltage and connections of nine switches from desired three-phase output voltage and three-phase input current (an AC-AC direct conversion method). It is a purpose to reduce output voltage harmonics and to prevent a switch change between an input maximum voltage phase and an input minimum voltage phase. In addition, it is effective for reducing a power loss and a noise reduction.

Non-patent documents 1 and 2 have proposed an addition of the following conditions to a switching pattern generation condition within a control period T in a conventional AC/AC direct conversion method.

1. Commutations from the input maximum voltage phase to the minimum voltage phase and from the minimum voltage phase to the maximum voltage phase are inhibited.

2. An input minimum voltage phase is not connected to a maximum voltage phase of an output voltage command. An input maximum voltage phase is not connected to a minimum voltage phase of the output voltage command.

FIG. 2 shows examples of the switching patterns and the output voltage to which the above-described conditions are added. FIG. 2(a) shows a case where an output voltage command value is high and FIG. 2(b) shows a case where the output voltage command value is low, respectively (it should be noted that Figs. (a) and (b) of 2 indicate a case when input phase voltage R phase>S phase>T phase and output command value phase voltages U phase>V phase>W phase.

As a technique to generate the above-described switching patterns, a triangular wave comparison method can be utilized which is a simple technique which has conventionally and frequently been used. Duties to turn on three switches respectively connected to respective phases of the output of the matrix converter are calculated and, thereafter, carrier comparisons are made separately for the respective output phases to determine pulse output duration times.

A method described in non-patent document 3 adopts a method in which, after duty values are calculated through a conventional virtual indirect modulation method, the calculated duty values are expanded to the carrier comparisons separately for respective three phases as described in non-patent document 1, in view of the fact that the conventional duty calculations are based on a direct AC/AC conversion form and the duty calculations that the direct AC/AC conversion form naturally has need to provide such a condition that the three-phase effective power is constant.

This method has a maximum feature that, although a stage at which the duties are calculated is in the virtual indirect modulation method, the same pulse pattern as the AC/AC direct conversion modulation method is obtained after the three-phase separate comparison.

Non-patent document 3 describes that the space vector at an input virtual rectifier and the space vector at an output virtual inverter are obtained from a power source voltage detection value and the output voltage command as shown in FIG. 3. At the same time, as shown in FIG. 4, sector information of the input and output command vectors and a magnitude relationship information of input power source R, S, and T phases and output U-phase, V-phase, and W-phase are obtained.

It should, herein, be noted that the sector information will be explained. The input current command and the output voltage command are three-phase to two-phase converted to obtain their respective instantaneous space command vectors. In addition, switching combinations of the virtual rectifier and the virtual inverter define the respective space vectors as shown in FIG. 3. At this time, command vectors such as to draw circle loci in spaces in FIG. 3, namely, provide three-phase sinusoidal wave current and voltage commands, respectively. Herein, these space are partitioned as shown in FIG. 4. In a case of the input current space vector of FIG. 4(a), when the phase of the input current command vector is from zero degrees (0) to 30 degrees, sector 1 is defined and when the phase of the input current command vector is from 30 degrees to 60 degrees, sector 2 is defined. In the same way, when the space partition is continued over 360 degrees, twelve sectors of sector 1 through 12 can be defined according to the phase. In a case of the output voltage command vector, six sectors for each of 60 degrees can be defined.

Base vectors $I_A$, $I_B$ at the input rectifier side utilized to constitute the input current command vector and duties $d_A$, $d_B$ per unit time (a control period) for the base vectors are obtained through calculations from the information on the input current command vector (refer to a second item of non-patent document 3).

In the same way, base vectors $V_X$, $V_Y$ at the output side to be utilized and duties $d_X$, $d_Y$ for the base vectors described above are obtained through the calculations, as shown in FIG. 5 from the information on the output voltage command vector. It should be noted that Iin* in FIG. 5(a) denotes the input current command vector and Vout* in FIG. 5(b) denotes the output voltage command vector, respectively.

Then, the input side duties are synthesized with the output side duties so that the switching pattern of the matrix converter and the duties thereof shown in FIG. 6 can be obtained. The sector information on the input and output command vectors and the switching pattern of the matrix converter to be outputted through the synthesis of the input and output duties are as shown in Table 2.

TABLE 2

| | Rectifier | | | | | | | | | | | | | | | |
|---|---|---|---|---|---|---|---|---|---|---|---|---|---|---|---|---|
| | 1(R > S > T)RSRT | | | | | 2(R > S > T)RTST | | | | | 3(S > R > T)RTST | | | | | |
| Inverter | AX | AY | BX | BY | Z | AX | AY | BX | BY | Z | AX | AY | BX | BY | Z | |
| 1(U > V > W)100 110 | RSS | RRS | RTT | RRT | SSS | RTT | RRT | STT | SST | SSS | RTT | RRT | STT | SST | RRR | |
| 2(V > U > W)110 010 | RRS | SRS | RRT | TRT | SSS | RRT | TRT | SST | TST | SSS | RRT | TRT | SST | TST | RRR | |
| 3(V > W > U)010 011 | SRS | SRR | TRT | TRR | SSS | TRT | TRR | TST | TSS | SSS | TRT | TRR | TST | TSS | RRR | |
| 4(W > V > U)011 001 | SRR | SSR | TRR | TTR | SSS | TRR | TTR | TSS | TTS | SSS | TRR | TTR | TSS | TTS | RRR | |
| 5(W > U > V)001 101 | SSR | RSR | TTR | RTR | SSS | TTR | RTR | TTS | STS | SSS | TTR | RTR | TTS | STS | RRR | |
| 6(U > W > V)101 100 | RSR | RSS | RTR | RTT | SSS | RTR | RTT | STS | STT | SSS | RTR | RTT | STS | STT | RRR | |

| | Rectifier | | | | | | | | | | | | | | | |
|---|---|---|---|---|---|---|---|---|---|---|---|---|---|---|---|---|
| | 4(S > R > T)STSR | | | | | 5(S > T > R)STSR | | | | | 6(S > T > R)SRTR | | | | | |
| Inverter | AX | AY | BX | BY | Z | AX | AY | BX | BY | Z | AX | AY | BX | BY | Z | |
| 1(U > V > W)100 110 | STT | SST | SRR | SSR | RRR | STT | SST | SRR | SSR | TTT | SRR | SSR | TRR | TTR | TTT | |
| 2(V > U > W)110 010 | SST | TST | SSR | RSR | RRR | SST | TST | SSR | RSR | TTT | SSR | RSR | TTR | RTR | TTT | |
| 3(V > W > U)010 011 | TST | TSS | RSR | RSS | RRR | TST | TSS | RSR | RSS | TTT | RSR | RSS | RTR | RTT | TTT | |
| 4(W > V > U)011 001 | TSS | TTS | RSS | RRS | RRR | TSS | TTS | RSS | RRS | TTT | RSS | RRS | RTT | RRT | TTT | |
| 5(W > U > V)001 101 | TTS | STS | RRS | SRS | RRR | TTS | STS | RRS | SRS | TTT | RRS | SRS | RRT | TRT | TTT | |
| 6(U > W > V)101 100 | STS | STT | SRS | SRR | RRR | STS | STT | SRS | SRR | TTT | SRS | SRR | TRT | TRR | TTT | |

| | Rectifier | | | | | | | | | | | | | | | |
|---|---|---|---|---|---|---|---|---|---|---|---|---|---|---|---|---|
| | 7(T > S > R)SRTR | | | | | 8(T > S > R)TRTS | | | | | 9(T > R > S)TRTS | | | | | |
| Inverter | AX | AY | BX | BY | Z | AX | AY | BX | BY | Z | AX | AY | BX | BY | Z | |
| 1(U > V > W)100 110 | SRR | SSR | TRR | TTR | SSS | TRR | TTR | TTS | TSS | SSS | TRR | TTR | TSS | TTS | RRR | |
| 2(V > U > W)110 010 | SSR | RSR | TTR | RTR | SSS | TTR | RTR | TTS | STS | SSS | TTR | RTR | TTS | STS | RRR | |
| 3(V > W > U)010 011 | RSR | RSS | RTR | RTT | SSS | RTR | RTT | STS | STT | SSS | RTR | RTT | STS | STT | RRR | |
| 4(W > V > U)011 001 | RSS | RRS | RTT | RRT | SSS | RTT | RRT | STT | SST | SSS | RTT | RRT | STT | SST | RRR | |
| 5(W > U > V)001 101 | RRS | SRS | RRT | TRT | SSS | RRT | TRT | SST | TST | SSS | RRT | TRT | SST | TST | RRR | |
| 6(U > W > V)101 100 | SRS | SRR | TRT | TRR | SSS | TRT | TRR | TST | TSS | SSS | TRT | TRR | TST | TSS | RRR | |

| | Rectifier | | | | | | | | | | | | | | | |
|---|---|---|---|---|---|---|---|---|---|---|---|---|---|---|---|---|
| | 10(T > R > S)TSRS | | | | | 11(R > T > S)TSRS | | | | | 12(R > T > S)RSRT | | | | | |
| Inverter | AX | AY | BX | BY | Z | AX | AY | BX | BY | Z | AX | AY | BX | BY | Z | |
| 1(U > V > W)100 110 | TSS | TTS | RSS | RRS | RRR | TSS | TTS | RSS | RRS | TTT | RSS | RRS | RTT | RRT | TTT | |
| 2(V > U > W)110 010 | TTS | STS | RRS | SRS | RRR | TTS | STS | RRS | SRS | TTT | RRS | SRS | RRT | TRT | TTT | |
| 3(V > W > U)010 011 | STS | STT | SRS | SRR | RRR | STS | STT | SRS | SRR | TTT | SRS | SRR | TRT | TRR | TTT | |
| 4(W > V > U)011 001 | STT | SST | SRR | SSR | RRR | STT | SST | SRR | SSR | TTT | SRR | SSR | TRR | TTR | TTT | |
| 5(W > U > V)001 101 | SST | TST | SSR | RSR | RRR | SST | TST | SSR | RSR | TTT | SSR | RSR | TTR | RTR | TTT | |
| 6(U > W > V)101 100 | TST | TSS | RSR | RSS | RRR | TST | TSS | RSR | RSS | TTT | RSR | RSS | RTR | RTT | TTT | |

Using five switching patterns and duties obtained as described above, the expansion to the duties of the input phases of R, S, and T connected to output phases U, V, and W, respectively, is again carried out. For each of the phases, the duties associated with an input voltage maximum phase, an input voltage middle phase, an input minimum phase are derived in a form of sum of virtual duties. The duties thus obtained are used to obtain the patterns through the carrier comparisons shown in FIG. 7 so as to provide the minimum phase→middle phase→maximum phase→middle phase→minimum phase of the input voltage. The synthesis of the patterns obtained for each of the output phases can obtain the switching patterns which are the same as those described in non-patent documents 1 and 2.

Non-patent document 1: "PWM Control of Three-Phase to Three-Phase Matrix Converter for Reducing Output Voltage Harmonics" by Hiroshi Shimada and Takeharu Takeshita in Semiconductor Power Conversion Study Circle SPC-05-48 (2005).

Non-patent document 2: "Matrix Converter Control Using Direct AC/AC Conversion Approach to Reduce Output Voltage Harmonics" by Hakaharu Takeshita and Hiroshi Shimada in Electrical Engineering Society paper magazine D, Vol. 126 No. 6 (2006).

Non-patent document 3: "Improvement of Pulse Pattern for Space Vector Modulated Matrix Converter" by Kiichiro Yamamoto, Katsuji Shinohara, and Tatsuya Mori in Semiconductor Power Conversion Study Circle SPC-06-159 (2006).

Non-patent document 4: "A Study of Space Vector Modulation Method for Three-Phase to Three-Phase Matrix Converter" by Yugo Tadano, Shota Urushibata, Masakatsu Nomura, and Tadashi Ashikaga in a mass meeting of electrical engineering society industrial application department in Heisei 18 1-04-4 (2006).

DISCLOSURE OF THE INVENTION

Problem to be Solved by the Invention

However, since, in the methods described in non-patent documents 1 through 3, the carrier comparisons are carried out separately for the respective three phases during pulse generation and arrangement, number of commutations cannot be reduced at a transient time of a sector transition.

In addition, in the carrier comparison methods described in non-patent documents 1 through 3, there are many examples in which the compared result is applied directly as a PWM pulse. A mode in which two or more switches are simultaneously operated at a time of a sector transit is developed.

Furthermore, it is necessary to perform the control by comparing three carriers separately for the carrier comparisons.

It is, in view of the above-described problems, an object of the present invention to provide a matrix converter space vector modulation method in which only a single carrier is used for the three phases when the carrier comparisons are made, the number of commutations are reduced in a case where the switching pattern is changed into its adjacent sector, and two or more switches are not simultaneously operated.

Means to Solve the Problem

According to the invention described in the claim 1 to solve the above-described problem, there is provided a matrix converter space vector modulation method in which bidirectional switches of a matrix converter are PWM controlled in a space vector modulation, comprising: supposing line voltages of a multi-phase AC output to be states of vectors expanded on two-phase stationary $\alpha\beta$ axes; defining a simple harmonic oscillation vector axis whose phase in a sector in which an output voltage command value V*o is present is retarded as X axis and the simple harmonic oscillation axis whose phase in the sector is advanced as Y axis; supposing maximum vectors $X_L, Y_L$, middle vectors $X_M, Y_M$, and minimum vectors $X_S, Y_S$ on the respective axes, a zero vector Z which provides a middle voltage of phase voltages, and a rotation vector R which is present singly in the sector to be base vectors; converting switching patterns for which virtual indirect space vectors are used into other switching patterns for which direct conversion space vectors constituted by a combination of five vectors are used; selecting any one of the converted switching patterns which satisfies predetermined conditions to reduce harmonics of an input current of the matrix converter and/or an output voltage thereof; calculating duties of the five space vectors which make a transit in the selected switching pattern from duty relationship equations between the virtual indirect space vectors and the direct conversion space vectors; and performing the PWM control for the bidirectional switches on a basis of the calculated duties.

According to the invention described in the claim 2, the predetermined conditions include a condition that an input minimum voltage phase is not connected to a maximum voltage phase of an output voltage command and an input maximum voltage phase is not connected to a minimum voltage phase of the output voltage phase and another condition that changes of input phases to be connected to output phases from the maximum voltage phase to the minimum voltage phase and from the minimum voltage phase to the maximum voltage phase are inhibited.

According to the invention described in the claim 3, the calculation of the duties is carried out using a table in which the duties corresponding to the switching pattern for which the direct conversion five space vectors are used expressed in the duties to be applied to the switching pattern for which the virtual indirect space vectors are used.

According to the invention described in the claim 4, in a case where, when a region constituted by the output voltage command value vector and simple harmonic oscillation vectors enclosing the output voltage command value vector is defined as a sector, the switching pattern is changed into an adjacent sector at either an input side or an output side, the switching pattern is not updated.

Effects of the Invention (1) According to the invention described in the claims 1 through 4, in the carrier comparison, only one carrier may be used for the three phases. Thus, a remarkable reduction in the number of carriers from conventional three can be achieved. For example, as compared with non-patent documents 1 and 2, use of a conventional control method can be made and calculation conditions that the direct conversion method inherently has become unnecessary.

(2) According to the invention described in the claim 3, candidates of a final switching signal can previously be grasped as an already known condition from the table.

(3) Furthermore, according to the invention described in claim 4, in a case where the switching pattern is changed to an adjacent sector, the number of commutations can be reduced and the two or more switches are not simultaneously operated.

BEST MODE FOR CARRYING OUT OF THE INVENTION

Hereinafter, the AC-AC direct conversion device will be explained as the matrix converter in which bidirectional switches are PWM controlled. Preferred embodiments of the space vector modulation method according to the present invention will be described with reference to the drawings. The present invention is not limited to the preferred embodiments described below.

First, a principle of the present invention will be described. In the matrix converter, the input virtual rectifier side space vector and the output virtual inverter space vector are obtained from the power source voltage detection values and the output voltage commands. In addition, sector information (an input sector and an output sector) of an input current command vector and an output voltage command vector and magnitude relationships of R phase, S phase, and T phase of the input power source and U phase, V phase, and W phase of the output phases are obtained from the power source voltage detection values and the output voltage commands. In addition, from the sector information and previously calculated virtual indirect conversion duty calculation results, instantaneous U-phase, V-phase, and W-phase switching patterns and duty equations to be applied can uniquely be determined. Furthermore, in which order switching patterns after the synthesis are arranged can uniquely be determined from the magnitude relationship in the duty equations of the respective phases.

Hence, if the virtual indirect conversion duties, the input-and-output sectors, and the magnitude relationship of the duty calculation equations are determined, final five duties and a switching order can be determined using, for example, a table. These pieces of information may be used to transform them to a time information through the carrier comparisons.

First Embodiment

Using the conventional AC/DC/AC virtual indirect conversion method in the same way as described in non-patent document 3, switching duties of the matrix converter are calculated. The calculated virtual indirect conversion switching pattern is converted into the direct conversion switching pattern and duties including switching states which cannot be utilized in the virtual indirect conversion switching pattern using accompanied information such as a duty during which the switching in accordance with the switching pattern is performed per unit control time and the sector and rearranged.

First, a method in which five switching patterns and their duties obtained in the virtual indirect conversion method are converted into switching patterns and duties in the AC/AC direct conversion method will be described below. FIG. 8 shows an example in which an output voltage space vector is expressed in all switching patterns (27 ways) when the input phase voltage phase is 15 degrees. Suppose, herein, that the input current command, in the virtual indirect conversion space vector diagram, is present in sector 1 and the output voltage command is present in sector 1 (the magnitude relationship between input phase voltages indicates R phase>S phase>T phase and the magnitude relationship between output command phase voltages indicates U phase>V phase>W phase, respectively).

The virtual indirect conversion switching patterns selected at this time are five as RTT, RRT, RSS, RRS, and SSS on a basis of Table 2 (RTT means input phases connected to output U. V, and W phases in a sequence from a leftmost position and indicates switching states in which input R phase is connected to output U phase, input T phase is connected to output V phase, and input T phase is connected to output W phase, sequentially from the leftmost position).

Such states of input sector 1 and output sector 1 as described above indicate a region from A to B shown in FIG. 8 in the AC/AC direct conversion space vector. In this region, vectors representing eight switching states of vRTT, vRSS, vSTT, vRST, vSST, vRRS, vRRT, and vSSS are present (vSSS of an input middle voltage phase is used for the zero vector).

Five switching states obtained in the virtual indirect conversion switching patterns are expressed in five vectors shown in FIG. 9(b) from among eight vectors (respective three simple harmonic oscillation vectors for X axis and for Y axis, the zero vector, and the rotation vector). These vectors are adjusted through the duties to constitute the output command vector. According to the present invention, vectors other than those obtained in the virtual indirect conversion vector are appropriately used to constitute the output command vector. Thus, the switching patterns in the virtual indirect conversion method can be converted into those in the direct conversion method.

That is to say, the switching patterns (instantaneous space vector) obtained in the virtual indirect conversion method are basically obtained by synthesizing the switching patterns of rectifier+inverter. Patterns in which the input three phases are respectively connected to other different output three phases (the patterns corresponding to groups R1 and R2 in Table 1) cannot be used. This is because a DC link (P, N) to which the three phases of the input rectifier are connected has only vertical two phases (P, N phases). In addition, in a general virtual indirect conversion method, the rectifier side is controlled to provide a two-phase modulation with a phase voltage maximum phase as a reference. That is to say, the rectifier side is controlled in maximum and second largest switching patterns in terms of an inter-line of the three phases. For example, in a case of FIG. 3(a), RT of a line maximum and RS of a line third largest are used but ST of a line third maximum is not used. Hence, the switching patterns (SST, STT) used in the AC/AC direct conversion method as shown in FIG. 9(a) do not appear on those in the virtual indirect conversion method as shown in FIG. 9(b). It should, herein, be noted that, in a case where the virtual rectifier side is PAM controlled, ST can be utilized.

Herein, if such a condition that an input minimum voltage phase is not connected to a maximum voltage phase of the output voltage command and an input maximum voltage phase is not connected to the minimum voltage phase of the output voltage command is given, both of an initial switching pattern and a final switching pattern are uniquely determined. In the initial switching pattern, only the maximum voltage phase is connected to the output maximum voltage phase and the output middle voltage phase and the minimum voltage phase are connected to the input minimum voltage phase. In addition, in the final switching pattern, only the output minimum voltage phase is connected to an input middle voltage phase and both of the output maximum voltage phase and the middle voltage phase are connected to the input maximum voltage phase.

If this is applied to the above-described example, the switching pattern is STT in the case of the initial switching pattern and is RRS in the case of the final switching pattern.

When the five space vectors constituting the command vectors are selected from the eight space vectors, initial selection and final selection indicate the space vectors such that many of the command space vectors are connected to the minimum voltage phase and not zero vectors and many of the command space vectors are connected to the maximum voltage phase and not zero vectors (in each phase, the switching change occurs in such an order as T→S→R or R→T→S). In the above-described example, the minimum voltage phase is T phase, STT is selected since TTT cannot be used and the maximum voltage phase is R and RRT is selected since RRR cannot be used.

Next, when such a condition that changes of the input phases to be connected to the output phases from the maximum voltage phase to the minimum voltage phase and from the minimum voltage phase to the maximum voltage phase are inhibited is added, a transit of the switching pattern is indicated as shown in FIG. 10. FIG. 10 represents a relationship when the magnitude relationship of input phase voltages is R phase>S phase>T phase and the magnitude relationship of output phase voltages is U phase>V phase>W phase. For example, STT means that input S phase, T phase, and T phase are connected to output U phase, V phase, and T phase.

From among these four switching patterns of RTS, SRT, STS, and SRS do not satisfy the conditions of U phase>V phase>W phase and these are vectors which are generated in an opposite direction to the command vector so that these are not used. Hence, the switching patterns which change from STT to RRS are totally five ways (right side in FIG. 10). From among the five way switching patterns, any one of these patterns may be selected.

The above-described selection of the switching patterns is established in every input sector and output sector. The switching patterns of arbitrary input sectors and output sectors in the virtual indirect conversion method and the switching patterns of the AC/AC direct conversion method are represented in Tables 3 through 6.

TABLE 3

| Inverter | Rectifier 1(R > S > T) | | | | | | | | | |
|---|---|---|---|---|---|---|---|---|---|---|
| | AX | AY | BX | BY | Z | A | B | C | D | E |
| 1(U > V > W) | RSS | RRS | RTT | RRT | SSS | STT | RTT | RST | RRT | RRS |
| | | | | | | STT | RTT | RST | RSS | RRS |
| | | | | | | STT | SST | RST | RRT | RRS |
| | | | | | | STT | SST | RST | RSS | RRS |
| | | | | | | STT | SST | SSS | RSS | RRS |
| 2(V > U > W) | RRS | SRS | RRT | TRT | SSS | TST | TRT | SRT | RRT | RRS |
| | | | | | | TST | TRT | SRT | SRS | RRS |
| | | | | | | TST | SST | SRT | RRT | RRS |
| | | | | | | TST | SST | SRT | SRS | RRS |
| | | | | | | TST | SST | SSS | SRS | RRS |
| 3(V > W > U) | SRS | SRR | TRT | TRR | SSS | TST | TRT | TRS | TRR | SRR |
| | | | | | | TST | TRT | TRS | SRS | SRR |
| | | | | | | TST | TSS | TRS | TRR | SRR |
| | | | | | | TST | TSS | TRS | SRS | SRR |
| | | | | | | TST | TSS | SSS | SRS | SRR |
| 4(W > V > U) | SRR | SSR | TRR | TTR | SSS | TTS | TTR | TSR | TRR | SRR |
| | | | | | | TTS | TTR | TSR | SSR | SRR |
| | | | | | | TTS | TSS | TSR | TRR | SRR |
| | | | | | | TTS | TSS | TSR | SSR | SRR |
| | | | | | | TTS | TSS | SSS | SSR | SRR |
| 5(W > U > V) | SSR | RSR | TTR | RTR | SSS | TTS | TTR | STR | RTR | RSR |
| | | | | | | TTS | TTR | STR | SSR | RSR |
| | | | | | | TTS | STS | STR | RTR | RSR |
| | | | | | | TTS | STS | STR | SSR | RSR |
| | | | | | | TTS | STS | SSS | SSR | RSR |
| 6(U > W > V) | RSR | RSS | RTR | RTT | SSS | STT | RTT | RTS | RTR | RSR |
| | | | | | | STT | RTT | RTS | RSS | RSR |
| | | | | | | STT | STS | RTS | RTR | RSR |
| | | | | | | STT | STS | RTS | RSS | RSR |
| | | | | | | STT | STS | SSS | RSS | RSR |

| Inverter | Rectifier 2(R > S > T) | | | | | | | | | |
|---|---|---|---|---|---|---|---|---|---|---|
| | AX | AY | BX | BY | Z | A | B | C | D | E |
| 1(U > V > W) | RTT | RRT | STT | SST | SSS | STT | RTT | RST | RRT | RRS |
| | | | | | | STT | RTT | RST | RSS | RRS |
| | | | | | | STT | SST | RST | RRT | RRS |
| | | | | | | STT | SST | RST | RSS | RRS |
| | | | | | | STT | SST | SSS | RSS | RRS |
| 2(V > U > W) | RRT | TRT | SST | TST | SSS | TST | TRT | SRT | RRT | RRS |
| | | | | | | TST | TRT | SRT | SRS | RRS |
| | | | | | | TST | SST | SRT | RRT | RRS |
| | | | | | | TST | SST | SRT | SRS | RRS |
| | | | | | | TST | SST | SSS | SRS | RRS |
| 3(V > W > U) | TRT | TRR | TST | TSS | SSS | TST | TRT | TRS | TRR | SRR |
| | | | | | | TST | TRT | TRS | SRS | SRR |
| | | | | | | TST | TSS | TRS | TRR | SRR |
| | | | | | | TST | TSS | TRS | SRS | SRR |
| | | | | | | TST | TSS | SSS | SRS | SRR |
| 4(W > V > U) | TRR | TTR | TSS | TTS | SSS | TTS | TTR | TSR | TRR | SRR |
| | | | | | | TTS | TTR | TSR | SSR | SRR |
| | | | | | | TTS | TSS | TSR | TRR | SRR |
| | | | | | | TTS | TSS | TSR | SSR | SRR |
| | | | | | | TTS | TSS | SSS | SSR | SRR |
| 5(W > U > V) | TTR | RTR | TTS | STS | SSS | TTS | TTR | STR | RTR | RSR |
| | | | | | | TTS | TTR | STR | SSR | RSR |
| | | | | | | TTS | STS | STR | RTR | RSR |
| | | | | | | TTS | STS | STR | SSR | RSR |
| | | | | | | TTS | STS | SSS | SSR | RSR |
| 6(U > W > V) | RTR | RTT | STS | STT | SSS | STT | RTT | RTS | RTR | RSR |
| | | | | | | STT | RTT | RTS | RSS | RSR |
| | | | | | | STT | STS | RTS | RTR | RSR |
| | | | | | | STT | STS | RTS | RSS | RSR |
| | | | | | | STT | STS | SSS | RSS | RSR |

| Inverter | Rectifier 3(S > R > T)RTST | | | | | | | | | |
|---|---|---|---|---|---|---|---|---|---|---|
| | AX | AY | BX | BY | Z | A | B | C | D | E |
| 1(U > V > W) | RTT | RRT | STT | SST | RRR | RTT | STT | SRT | SST | SSR |
| | | | | | | RTT | STT | SRT | SRR | SSR |
| | | | | | | RTT | RRT | SRT | SST | SSR |

TABLE 3-continued

| | | | | | | | | | | |
|---|---|---|---|---|---|---|---|---|---|---|
| | | | | | | RTT | RRT | SRT | SRR | SSR |
| | | | | | | RTT | RRT | RRR | SRR | SSR |
| 2(V > U > W) | RRT | TRT | SST | TST | RRR | TRT | TST | RST | SST | SSR |
| | | | | | | TRT | TST | RST | RSR | SSR |
| | | | | | | TRT | RRT | RST | SST | SSR |
| | | | | | | TRT | RRT | RST | RSR | SSR |
| | | | | | | TRT | RRT | RRR | RSR | SSR |
| 3(V > W > U) | TRT | TRR | TST | TSS | RRR | TRT | TST | TRS | TSS | RSS |
| | | | | | | TRT | TST | TRS | RSR | RSS |
| | | | | | | TRT | TRR | TRS | TSS | RSS |
| | | | | | | TRT | TRR | TSR | RSR | RSS |
| | | | | | | TRT | TRR | RRR | RSR | RSS |
| 4(W > V > U) | TRR | TTR | TSS | TTS | RRR | TTR | TTS | TRS | TSS | RSS |
| | | | | | | TTR | TTS | TRS | RRS | RSS |
| | | | | | | TTR | TRR | TRS | TSS | RSS |
| | | | | | | TTR | TRR | TRS | RRS | RSS |
| | | | | | | TTR | TRR | RRR | RRS | RSS |
| 5(W > U > V) | TTR | RTR | TTS | STS | RRR | TTR | TTS | RTS | STS | SRS |
| | | | | | | TTR | TTS | RTS | RRS | SRS |
| | | | | | | TTR | RTR | RTS | STS | SRS |
| | | | | | | TTR | RTR | RTS | RRS | SRS |
| | | | | | | TTR | RTR | RRR | RRS | SRS |
| 6(U > W > V) | RTR | RTT | STS | STT | RRR | RTT | STT | STR | STS | SRS |
| | | | | | | RTT | STT | STR | SRR | SRS |
| | | | | | | RTT | RTR | STR | STS | SRS |
| | | | | | | RTT | RTR | STR | SRR | SRS |
| | | | | | | RTT | RTR | RRR | SRR | SRS |

TABLE 4

| | Rectifier 4(S > R > T)STSR | | | | | | | | | |
|---|---|---|---|---|---|---|---|---|---|---|
| Inverter | AX | AY | BX | BY | Z | A | B | C | D | E |
| 1(U > V > W) | STT | SST | SRR | SSR | RRR | RTT | STT | SRT | SST | SSR |
| | | | | | | RTT | STT | SRT | SRR | SSR |
| | | | | | | RTT | RRT | SRT | SST | SSR |
| | | | | | | RTT | RRT | SRT | SRR | SSR |
| | | | | | | RTT | RRT | RRR | SRR | SSR |
| 2(V > U > W) | SST | TST | SSR | RSR | RRR | TRT | TST | RST | SST | SSR |
| | | | | | | TRT | TST | RST | RSR | SSR |
| | | | | | | TRT | RRT | RST | SST | SSR |
| | | | | | | TRT | RRT | RST | RSR | SSR |
| | | | | | | TRT | RRT | RRR | RSR | SSR |
| 3(V > W > U) | TST | TSS | RSR | RSS | RRR | TRT | TST | TSR | TSS | RSS |
| | | | | | | TRT | TST | TSR | RSR | RSS |
| | | | | | | TRT | TRR | TSR | TSS | RSS |
| | | | | | | TRT | TRR | TSR | RSR | RSS |
| | | | | | | TRT | TRR | RRR | RSR | RSS |
| 4(W > V > U) | TSS | TTS | RSS | RRS | RRR | TTR | TTS | TRS | TSS | RSS |
| | | | | | | TTR | TTS | TRS | RRS | RSS |
| | | | | | | TTR | TRR | TRS | TSS | RSS |
| | | | | | | TTR | TRR | TRS | RRS | RSS |
| | | | | | | TTR | TRR | RRR | RRS | RSS |
| 5(W > U > V) | TTS | STS | RRS | SRS | RRR | TTR | TTS | RTS | STS | SRS |
| | | | | | | TTR | TTS | RTS | RRS | SRS |
| | | | | | | TTR | RTR | RTS | STS | SRS |
| | | | | | | TTR | RTR | RTS | RRS | SRS |
| | | | | | | TTR | RTR | RRR | RRS | SRS |
| 6(U > W > V) | STS | STT | SRS | SRR | RRR | RTT | STT | STR | STS | SRS |
| | | | | | | RTT | STT | STR | SRR | SRS |
| | | | | | | RTT | RTR | STR | STS | SRS |
| | | | | | | RTT | RTR | STR | SRR | SRS |
| | | | | | | RTT | RTR | RRR | SRR | SRS |

| | Rectifier 5(S > T > R)STSR | | | | | | | | | |
|---|---|---|---|---|---|---|---|---|---|---|
| Inverter | AX | AY | BX | BY | Z | A | B | C | D | E |
| 1(U > V > W) | STT | SST | SRR | SSR | TTT | TRR | SRR | STR | SSR | SST |
| | | | | | | TRR | SRR | STR | STT | SST |
| | | | | | | TRR | TTR | STR | SSR | SST |
| | | | | | | TRR | TTR | STR | STT | SST |
| | | | | | | TRR | TTR | TTT | STT | SST |

TABLE 4-continued

| Inverter | AX | AY | BX | BY | Z | A | B | C | D | E |
|---|---|---|---|---|---|---|---|---|---|---|
| 2(V > U > W) | SST | TST | SSR | RSR | TTT | RTR | RSR | TSR | SSR | SST |
| | | | | | | RTR | RSR | TSR | TST | SST |
| | | | | | | RTR | TTR | TSR | SSR | SST |
| | | | | | | RTR | TTR | TSR | TST | SST |
| | | | | | | RTR | TTR | TTT | TST | SST |
| 3(V > W > U) | TST | TSS | RSR | RSS | TTT | RTR | RSR | RST | RSS | TSS |
| | | | | | | RTR | RSR | RST | TST | TSS |
| | | | | | | RTR | RTT | RST | RSS | TSS |
| | | | | | | RTR | RTT | RST | TST | TSS |
| | | | | | | RTR | RTT | TTT | TST | TSS |
| 4(W > V > U) | TSS | TTS | RSS | RRS | TTT | RRT | RRS | RTS | RSS | TSS |
| | | | | | | RRT | RRS | RTS | TTS | TSS |
| | | | | | | RRT | RTT | RTS | RSS | TSS |
| | | | | | | RRT | RTT | RTS | TTS | TSS |
| | | | | | | RRT | RTT | TTT | TTS | TSS |
| 5(W > U > V) | TTS | STS | RRS | SRS | TTT | RRT | RRS | TRS | SRS | STS |
| | | | | | | RRT | RRS | TRS | TTS | STS |
| | | | | | | RRT | TRT | TRS | SRS | STS |
| | | | | | | RRT | TRT | TRS | TTS | STS |
| | | | | | | RRT | TRT | TTT | TTS | STS |
| 6(U > W > V) | STS | STT | SRS | SRR | TTT | TRR | SRR | SRT | SRS | STS |
| | | | | | | TRR | SRR | SRT | STT | STS |
| | | | | | | TRR | TRT | SRT | SRS | STS |
| | | | | | | TRR | TRT | SRT | STT | STS |
| | | | | | | TRR | TRT | TTT | STT | STS |

| | Rectifier 6(S > T > R)SRTR | | | | | | | | | |
|---|---|---|---|---|---|---|---|---|---|---|
| Inverter | AX | AY | BX | BY | Z | A | B | C | D | E |
| 1(U > V > W) | SRR | SSR | TRR | TTR | TTT | TRR | SRR | STR | SSR | SST |
| | | | | | | TRR | SRR | STT | SSR | SST |
| | | | | | | TRR | TTR | STR | SSR | SST |
| | | | | | | TRR | TTR | STR | STT | SST |
| | | | | | | TRR | TTR | TTT | STT | SST |
| 2(V > U > W) | SSR | RSR | TTR | RTR | TTT | RTR | RSR | TSR | SSR | SST |
| | | | | | | RTR | RSR | TSR | TST | SST |
| | | | | | | RTR | TTR | TSR | SSR | SST |
| | | | | | | RTR | TTR | TSR | TST | SST |
| | | | | | | RTR | TTR | TTT | TST | SST |
| 3(V > W > U) | RSR | RSS | RTR | RTT | TTT | RTR | RSR | RST | RSS | TSS |
| | | | | | | RTR | RSR | RST | TST | TSS |
| | | | | | | RTR | RTT | RST | RSS | TSS |
| | | | | | | RTR | RTT | RST | TST | TSS |
| | | | | | | RTR | RTT | TTT | TST | TSS |
| 4(W > V > U) | RSS | RSS | RTT | RRT | TTT | RRT | RRS | RTS | RSS | TSS |
| | | | | | | RRT | RRS | RTS | TTS | TSS |
| | | | | | | RRT | RTT | RTS | RSS | TSS |
| | | | | | | RRT | RTT | RTS | TTS | TSS |
| | | | | | | RRT | RTT | TTT | TSS | TSS |
| 5(W > U > V) | RRS | SRS | RRT | TRT | TTT | RRT | RRS | TRS | SRS | STS |
| | | | | | | RRT | RRS | TRS | TTS | STS |
| | | | | | | RRT | TRT | TRS | SRS | STS |
| | | | | | | RRT | TRT | TRS | TTS | STS |
| | | | | | | RRT | TRT | TTT | TTS | STS |
| 6(U > W > V) | SRS | SRR | TRT | TRR | TTT | TRR | SRR | SRT | SRS | STS |
| | | | | | | TRR | SRR | SRT | STT | STS |
| | | | | | | TRR | TRT | SRT | SRS | STS |
| | | | | | | TRR | TRT | SRT | STT | STS |
| | | | | | | TRR | TRT | TTT | STT | STS |

TABLE 5

| | Rectifier 7(T > S > R)SRTR | | | | | | | | | |
|---|---|---|---|---|---|---|---|---|---|---|
| Inverter | AX | AY | BX | BY | Z | A | B | C | D | E |
| 1(U > V > W) | SRR | SSR | TRR | TTR | SSS | SRR | TRR | TSR | TTR | TTS |
| | | | | | | SRR | TRR | TSR | TSS | TTS |
| | | | | | | SRR | SSR | TSR | TTR | TTS |
| | | | | | | SRR | SSR | TSR | TSS | TTS |
| | | | | | | SRR | SSR | SSS | TSS | TTS |
| 2(V > U > W) | SSR | RSR | TTR | RTR | SSS | RSR | RTR | STR | TTR | TTS |
| | | | | | | RSR | RTR | STR | STS | TTS |
| | | | | | | RSR | SSR | STR | TTR | TTS |

TABLE 5-continued

| | | | | | | Rectifier | | | | |
|---|---|---|---|---|---|---|---|---|---|---|
| Inverter | AX | AY | BX | BY | Z | A | B | C | D | E |
| 3(V > W > U) | RSR | RSS | RTR | RTT | SSS | RSR | SSR | STR | STS | TTS |
| | | | | | | RSR | SSR | SSS | STS | TTS |
| | | | | | | RSR | RTR | RTS | RTT | STT |
| | | | | | | RSR | RTR | RTS | STS | STT |
| | | | | | | RSR | RSS | RTS | RTT | STT |
| | | | | | | RSR | RSS | RTS | STS | STT |
| | | | | | | RSR | RSS | SSS | STS | STT |
| 4(W > V > U) | RSS | RRS | RTT | RRT | SSS | RRS | RRT | RST | RTT | STT |
| | | | | | | RRS | RRT | RST | SST | STT |
| | | | | | | RRS | RSS | RST | RTT | STT |
| | | | | | | RRS | RSS | RST | SST | STT |
| | | | | | | RRS | RSS | SSS | SST | STT |
| 5(W > U > V) | RRS | SRS | RRT | TRT | SSS | RRS | RRT | SRT | TRT | TST |
| | | | | | | RRS | RRT | SRT | SST | TST |
| | | | | | | RRS | SRS | SRT | TRT | TST |
| | | | | | | RRS | SRS | SRT | SST | TST |
| | | | | | | RRS | SRS | SSS | SST | TST |
| 6(U > W > V) | SRS | SRR | TTR | TRR | SSS | SRR | TRR | TRS | TRT | TST |
| | | | | | | SRR | TRR | TRS | TSS | TST |
| | | | | | | SRR | SRS | TRS | TRT | TST |
| | | | | | | SRR | SRS | TRS | TSS | TST |
| | | | | | | SRR | SRS | SSS | TSS | TST |

| | | | | | | Rectifier 8(T > S > R)TRTS | | | | |
|---|---|---|---|---|---|---|---|---|---|---|
| Inverter | AX | AY | BX | BY | Z | A | B | C | D | E |
| 1(U > V > W) | TRR | TTR | TSS | TTS | SSS | SRR | TRR | TSR | TTR | TTS |
| | | | | | | SRR | TRR | TSR | TSS | TTS |
| | | | | | | SRR | SSR | TSR | TTR | TTS |
| | | | | | | SRR | SSR | TSR | TSS | TTS |
| | | | | | | SRR | SSR | SSS | TSS | TTS |
| 2(V > U > W) | TTR | RTR | TTS | STS | SSS | RSR | RTR | STR | TTR | TTS |
| | | | | | | RSR | RTR | STR | STS | TTS |
| | | | | | | RSR | SSR | STR | TTR | TTS |
| | | | | | | RSR | SSR | STR | STS | TTS |
| | | | | | | RSR | SSR | SSS | STS | TTS |
| 3(V > W > U) | RTR | RTT | STS | STT | SSS | RSR | RTR | RTS | RTT | STT |
| | | | | | | RSR | RTR | RTS | STS | STT |
| | | | | | | RSR | RSS | RTS | RTT | STT |
| | | | | | | RSR | RSS | RTS | STS | STT |
| | | | | | | RSR | RSS | SSS | STS | STT |
| 4(W > V > U) | RTT | RRT | STT | SST | SSS | RRS | RRT | RST | RTT | STT |
| | | | | | | RRS | RRT | RST | SST | STT |
| | | | | | | RRS | RSS | RST | RTT | STT |
| | | | | | | RRS | RSS | RST | SST | STT |
| | | | | | | RRS | RSS | SSS | SST | STT |
| 5(W > U > V) | RRT | TRT | SST | TST | SSS | RRS | RRT | SRT | TRT | TST |
| | | | | | | RRS | RRT | SRT | SST | TST |
| | | | | | | RRS | SRS | SRT | TRT | TST |
| | | | | | | RRS | SRS | SRT | SST | TST |
| | | | | | | RRS | SRS | SSS | SST | TST |
| 6(U > W > V) | TRT | TRR | TST | TSS | SSS | SRR | TRR | TRS | TRT | TST |
| | | | | | | SRR | TRR | TRS | TSS | TST |
| | | | | | | SRR | SRS | TRS | TRT | TST |
| | | | | | | SRR | SRS | TRS | TSS | TST |
| | | | | | | SRR | SRS | SSS | TSS | TST |

| | | | | | | Rectifier 9(T > R > S)TRTS | | | | |
|---|---|---|---|---|---|---|---|---|---|---|
| Inverter | AX | AY | BX | BY | Z | A | B | C | D | E |
| 1(U > V > W) | TRR | TTR | TSS | TTS | RRR | RSS | TSS | TRS | TTS | TTR |
| | | | | | | RSS | TSS | TRS | TRR | TTR |
| | | | | | | RSS | RRS | TRS | TTS | TTR |
| | | | | | | RSS | RRS | TRS | TRR | TTR |
| | | | | | | RSS | RRS | RRR | TRR | TTR |
| 2(V > U > W) | TTR | RTR | TTS | STS | RRR | SRS | STS | RTS | TTS | TTR |
| | | | | | | SRS | STS | RTS | RTR | TTR |
| | | | | | | SRS | RRS | RTS | TTS | TTR |
| | | | | | | SRS | RRS | RTS | RTR | TTR |
| | | | | | | SRS | RRS | RRR | RTR | TTR |
| 3(V > W > U) | RTR | RTT | STS | STT | RRR | SRS | STS | STR | STT | RTT |
| | | | | | | SRS | STS | STR | RTR | RTT |
| | | | | | | SRS | SRR | STR | STT | RTT |
| | | | | | | SRS | SRR | STR | RTR | RTT |
| | | | | | | SRS | SRR | RRR | RTR | RTT |

TABLE 5-continued

| | AX | AY | BX | BY | Z | A | B | C | D | E |
|---|---|---|---|---|---|---|---|---|---|---|
| 4(W>V>U) | RTT | RRT | STT | SST | RRR | SSR | SST | SRT | STT | RTT |
| | | | | | | SSR | SST | SRT | RRT | RTT |
| | | | | | | SSR | SRR | SRT | STT | RTT |
| | | | | | | SSR | SRR | SRT | RRT | RTT |
| | | | | | | SSR | SRR | RRR | RRT | RTT |
| 5(W>U>V) | RRT | TRT | SST | TST | RRR | SSR | SST | RST | TST | TRT |
| | | | | | | SSR | SST | RST | RRT | TRT |
| | | | | | | SSR | RSR | RST | TST | TRT |
| | | | | | | SSR | RSR | RST | RRT | TRT |
| | | | | | | SSR | RSR | RRR | RRT | TRT |
| 6(U>W>V) | TRT | TRR | TST | TSS | RRR | RSS | TSS | TSR | TST | TRT |
| | | | | | | RSS | TSS | TSR | TRR | TRT |
| | | | | | | RSS | RSR | TSR | TST | TRT |
| | | | | | | RSS | RSR | TSR | TRR | TRT |
| | | | | | | RSS | RSR | RRR | TRR | TRT |

TABLE 6

| | Rectifier 10(T>R>S)TSRS | | | | | | | | | |
|---|---|---|---|---|---|---|---|---|---|---|
| Inverter | AX | AY | BX | BY | Z | A | B | C | D | E |
| 1(U>V>W) | TSS | TTS | RSS | RRS | RRR | RSS | TSS | TRS | TTS | TTR |
| | | | | | | RSS | TSS | TRS | TRR | TTR |
| | | | | | | RSS | RRS | TRS | TTS | TTR |
| | | | | | | RSS | RRS | TRS | TRR | TTR |
| | | | | | | RSS | RRS | RRR | TRR | TTR |
| 2(V>U>W) | TTS | STS | RRS | SRS | RRR | SRS | STS | RTS | TTS | TTR |
| | | | | | | SRS | STS | RTS | RTR | TTR |
| | | | | | | SRS | RRS | RTS | TTS | TTR |
| | | | | | | SRS | RRS | RTS | RTR | TTR |
| | | | | | | SRS | RRS | RRR | RTR | TTR |
| 3(V>W>U) | STS | STT | SRS | SRR | RRR | SRS | STS | STR | STT | RTT |
| | | | | | | SRS | STS | STR | RTR | RTT |
| | | | | | | SRS | SRR | STR | STT | RTT |
| | | | | | | SRS | SRR | STR | RTR | RTT |
| | | | | | | SRS | SRR | RRR | RTR | RTT |
| 4(W>V>U) | STT | SST | SRR | SSR | RRR | SSR | SST | SRT | STT | RTT |
| | | | | | | SSR | SST | SRT | RRT | RTT |
| | | | | | | SSR | SRR | SRT | STT | RTT |
| | | | | | | SSR | SRR | SRT | RRT | RTT |
| | | | | | | SSR | SRR | RRR | RRT | RTT |
| 5(W>U>V) | SST | TST | SSR | RSR | RRR | SSR | SST | RST | TST | TRT |
| | | | | | | SSR | SST | RST | RRT | TRT |
| | | | | | | SSR | RSR | RST | TST | TRT |
| | | | | | | SSR | RSR | RST | RRT | TRT |
| | | | | | | SSR | RSR | RRR | RRT | TRT |
| 6(U>W>V) | TST | TSS | RSR | RSS | RRR | RSS | TSS | TSR | TST | TRT |
| | | | | | | RSS | TSS | TSR | TRR | TRT |
| | | | | | | RSS | RSR | TSR | TST | TRT |
| | | | | | | RSS | RSR | TSR | TRR | TRT |
| | | | | | | RSS | RSR | RRR | TRR | TRT |

| | Rectifier 11(R>T>S)TSRS | | | | | | | | | |
|---|---|---|---|---|---|---|---|---|---|---|
| Inverter | AX | AY | BX | BY | Z | A | B | C | D | E |
| 1(U>V>W) | TSS | TTS | RSS | RRS | TTT | TSS | RSS | RTS | RRS | RRT |
| | | | | | | TSS | RSS | RTS | RTT | RRT |
| | | | | | | TSS | TTS | RTS | RRS | RRT |
| | | | | | | TSS | TTS | RTS | RTT | RRT |
| | | | | | | TSS | TTS | TTT | RTT | RRT |
| 2(V>U>W) | TTS | STS | RRS | SRS | TTT | STS | SRS | TRS | RRS | RRT |
| | | | | | | STS | SRS | TRS | TRT | RRT |
| | | | | | | STS | TTS | TRS | RRS | RRT |
| | | | | | | STS | TTS | TRS | TRT | RRT |
| | | | | | | STS | TTS | TTT | TRT | RRT |
| 3(V>W>U) | STS | STT | SRS | SRR | TTT | STS | SRS | SRT | SRR | TRR |
| | | | | | | STS | SRS | SRT | TRT | TRR |
| | | | | | | STS | STT | SRT | SRR | TRR |
| | | | | | | STS | STT | SRT | TRT | TRR |
| | | | | | | STS | STT | TTT | TRT | TRR |
| 4(W>V>U) | STT | SST | SRR | SSR | TTT | SST | SSR | STR | SRR | TRR |
| | | | | | | SST | SSR | STR | TTR | TRR |
| | | | | | | SST | STT | STR | SRR | TRR |

TABLE 6-continued

| | | | | | | SST | STT | STR | TTR | TRR |
|---|---|---|---|---|---|---|---|---|---|---|
| | | | | | | SST | STT | TTT | TTR | TRR |
| 5(W > U > V) | SST | TST | SSR | RSR | TTT | SST | SSR | TSR | RSR | RTR |
| | | | | | | SST | SSR | TSR | TTR | RTR |
| | | | | | | SST | TST | TSR | RSR | RTR |
| | | | | | | SST | TST | TSR | TTR | RTR |
| | | | | | | SST | TST | TTT | TTR | RTR |
| 6(U > W > V) | TST | TSS | RSR | RSS | TTT | TSS | RSS | RST | RSR | RTR |
| | | | | | | TSS | RSS | RST | RTT | RTR |
| | | | | | | TSS | TST | RST | RSR | RTR |
| | | | | | | TSS | TST | RST | RTT | RTR |
| | | | | | | TSS | TST | TTT | RTT | RTR |

| | Rectifier 12(R > T > S)RSRT | | | | | | | | | |
|---|---|---|---|---|---|---|---|---|---|---|
| Inverter | AX | AY | BX | BY | Z | A | B | C | D | E |
| 1(U > V > W) | RSS | RRS | RTT | RRT | TTT | TSS | RSS | RTS | RRS | RRT |
| | | | | | | TSS | RSS | RTS | RTT | RRT |
| | | | | | | TSS | TTS | RTS | RRS | RRT |
| | | | | | | TSS | TTS | RTS | RTT | RRT |
| | | | | | | TSS | TTS | TTT | RTT | RRT |
| 2(V > U > W) | RRS | SRS | RRT | TRT | TTT | STS | SRS | TRS | RRS | RRT |
| | | | | | | STS | SRS | TRS | TRT | RRT |
| | | | | | | STS | TTS | TRS | RRS | RRT |
| | | | | | | STS | TTS | TRS | TRT | RRT |
| | | | | | | STS | TTS | TTT | TRT | RRT |
| 3(V > W > U) | SRS | SRR | TRT | TRR | TTT | STS | SRS | SRT | SRR | TRR |
| | | | | | | STS | SRS | SRT | TRT | TRR |
| | | | | | | STS | STT | SRT | SRR | TRR |
| | | | | | | STS | STT | SRT | TRT | TRR |
| | | | | | | STS | STT | TTT | TRT | TRR |
| 4(W > V > U) | SRR | SSR | TRR | TTR | TTT | SST | SSR | STR | SRR | TRR |
| | | | | | | SST | SSR | STR | TTR | TRR |
| | | | | | | SST | STT | STR | SRR | TRR |
| | | | | | | SST | STT | STR | TTR | TRR |
| | | | | | | SST | STT | TTT | TTR | TRR |
| 5(W > U > V) | SSR | RSR | TTR | RTR | TTT | SST | SSR | TSR | RSR | RTR |
| | | | | | | SST | SSR | TSR | TTR | RTR |
| | | | | | | SST | TST | TSR | RSR | RTR |
| | | | | | | SST | TST | TSR | TTR | RTR |
| | | | | | | SST | TST | TTT | TTR | RTR |
| 6(U > W > V) | RSR | RSS | RRT | RTT | TTT | TSS | RSS | RST | RSR | RTR |
| | | | | | | TSS | RSS | RST | RTT | RTR |
| | | | | | | TSS | TST | RST | RSR | RTR |
| | | | | | | TSS | TST | RST | RTT | RTR |
| | | | | | | TSS | TST | TTT | RTT | RTR |

Next, the duty conversion will be explained using the above-described example. From among five ways of switching patterns after the conversion to the AC/AC direct conversion method (refer to a right side of FIG. 10), first, the duty conversion using one of the five ways of the switching patterns, STT, SST, RST, RSS, and RRS will be described below.

Since the outputs after the conversions into the virtual indirect conversion method and into the AC/AC direct conversion method always need to be equal to each other, the following equation is established.

[Equation 1]

$$vSTT \cdot d_a + vSST \cdot d_b + vRST \cdot d_c + vRSS \cdot d_d + vRRS \cdot d_e + vRRS \cdot d_e = vRSS \cdot d_{AX} + vRRS \cdot d_{AY} + vRTT \cdot d_{BX} + vRRT \cdot d_{BY} + vSSS \cdot d_Z \quad (a)$$

It should, herein, be noted that $d_a, d_b, d_c, d_d$, and $d_e$ in equation (a) are respectively AC/AC direct conversion vector duties of vSTT, vSST, vRSS, vRSS, and vRRS. In addition, on these duties, the following two equations in (b) are established.

[Equation 2]

$$1 - d_{AX} - d_{AY} - d_{BX} - d_{BY} = d_Z$$

$$d_a + d_b + d_c + d_d + d_e = 1 \quad (b)$$

In addition, the following equations (e), (f), and (g) are established when only α-axis components are extracted from equation (a).

[Equation 3]

$$vSTT_\alpha \cdot d_a + vSST_\alpha \cdot d_b + vRST_\alpha \cdot d_c + vRSS_\alpha \cdot d_d + vRRS_\alpha \cdot d_e = vRSS_\alpha \cdot d_{AX} + vRRS_\alpha \cdot d_{AY} + vRTT_\alpha \cdot d_{BX} + vRRT_\alpha \cdot d_{BY} \quad (e)$$

In equation (e), $vRSS_\alpha$, $vRRS_\alpha$, $vRTT_\alpha$, $vRRT_\alpha$, $vSTT_\alpha$, $vSST_\alpha$, and $vRST_\alpha$ represent α-axis components of their vectors respectively (that is to say, for example, $vRSS_\alpha = |vRSS|$, $vRRS_\alpha = |vRRS| \cdot \cos(\pi/3)$). When equation (e) is further converted to provide equations (f) and (g).

[Equation 4]

$$vSTT_\alpha \cdot d_a + vSST_\alpha \cdot d_b + (vRSS_\alpha + vSST_\alpha) \cdot d_c + vRSS_\alpha \cdot d_d + vRRS_\alpha \cdot d_e = vRSS_\alpha \cdot d_{AX} + vRRS_\alpha \cdot d_{AY} + (vRSS_\alpha + vSTT_\alpha) \cdot d_{BX} + (vSST_\alpha + vRRS_\alpha) \cdot d_{BY} \quad (f)$$

$$vSTT_\alpha \cdot d_a + vSST_\alpha \cdot (d_b + d_c) + vRSS_\alpha \cdot (d_c + d_d) + vRRS_\alpha \cdot d_e = vSTT_\alpha \cdot d_{BX} + vSST_\alpha \cdot d_{BY} + vRSS_\alpha \cdot (d_{AX} + d_{BX}) + vRRS_\alpha \cdot (d_{AY} + d_{BY}) \quad (g)$$

When both sides of equation (g) are compared with each other, the following equations (h), (i), (j), and (k) are obtained.

[Equation 5]

$$d_a = d_{BX} \quad (h)$$

$$d_b + d_c = d_{BY} \quad (i)$$

$$d_c + d_d = d_{AX} + d_{BX} \quad (j)$$

$$d_e = d_{AY} + d_{BY} \quad (k)$$

From the equations of (c), (h), (i), and (k), the following equations of (h), (l), (m), (n), and (k) are given.

[Equation 6]

$$d_a = d_{BX} \quad (h)$$

$$d_b = 1 - d_{AX} - 2d_{BX} - d_{AY} - d_{BY} \quad (l)$$

$$d_c = d_{AX} + 2d_{BX} + d_{AY} + 2d_{BY} - 1 \quad (m)$$

$$d_d = 1 - d_{BX} - d_{AY} - 2d_{BY} \quad (n)$$

$$d_e = d_{AY} + d_{BY} \quad (k)$$

Hence, the duties when RTT, RRT, RSS, RRS, and SSS are converted into STT, SST, RST, RSS, and RRS are determined through simple additions and subtractions. In the case of the remaining four ways of switching patterns, their duties can be determined in a form of the additions and subtractions of the duties before the conversion.

In a case where the respective conversions of the duties are carried out and their results indicate inconsistencies (the results of duties indicate minus values), it means that the corresponding switching pattern candidate cannot obtain the equivalent input and output before the conversion. Hence, if the duties of the subsequent switching pattern are tried to be converted and a correct switching pattern is searched from the five ways of the switching patterns.

The AC/AC direct conversion switching pattern thus obtained and the duties thereof are compared with a single carrier as shown in FIG. 11. Thus, a final switching signal can be obtained. A triangular wave or so forth can be used as the carrier. Updating of the switching pattern and duties thereof is carried out at vertices of the triangular wave.

A table determining the switching pattern and the duties thereof from the sector information on the input side virtual indirect conversion space vectors and the sector information of the virtual indirect conversion output side space vectors will, herein, be explained. First, in the AC/AC direct conversion output voltage space vector group, the command vector and the vectors enclosing this command vector present in a sector through 60 degrees and constituted by simple harmonic oscillation vectors are defined as shown in FIG. 12. In the above-described 60-degree sector shown in FIG. 12, a single rotating vector is always present in this sector and is supposed to be R. The vectors which are in a phase retarded than the command vector and have instantaneous values in a larger sequence are supposed to be XL, XM, and XS. The vectors which are in a phase advanced than the command vector and have instantaneous values in the larger sequence are supposed to be YL, YM, and YS. Zero vector Z is selected from one of the vectors which is constituted by the input middle voltage phase.

Sector modes are set as shown in Table 7 from the sectors of the virtual indirect conversion input current space vectors and output voltage space vectors.

TABLE 7

DEFINITION OF SECTOR MODE

| input sector | output sector | sector mode |
| --- | --- | --- |
| 1, 4, 5, 8, 9, 12 | 1, 3, 5 | sm1 |
|  | 2, 4, 6 | sm2 |
| 2, 3, 6, 7, 10, 11 | 1, 3, 5 | sm2 |
|  | 2, 4, 6 | sm1 |

Sector mode 1 (sm1) is defined if output sectors are sectors 1, 3, and 5 when input sectors are sectors 1, 4, 5, 8, 9, and 12 or if output sectors are sectors 2, 4, and 6 when input sectors are 2, 3, 6, 7, 10, and 11 and sector mode 2 (sm2) is defined if output sectors are sectors 1, 3, and 5 when input sectors are sectors 2, 3, 6, 7, 10, and 11.

The switching patterns after the conversion from the virtual indirect conversion switching pattern to the AC/AC direct conversion switching pattern derived in the respective sector modes are respectively for each of the sector modes as shown in Table 8.

TABLE 8

SELECTION PATTERN OF 5-VECTORS

| sector mode | selection pattern | v1 | v2 | v3 | v4 | v5 |
| --- | --- | --- | --- | --- | --- | --- |
| sm1 | 1 | $X_S$ | $Y_S$ | Z | $X_M$ | $Y_M$ |
|  | 2 | $X_S$ | $Y_S$ | R | $X_M$ | $Y_M$ |
|  | 3 | $X_S$ | $X_L$ | R | $Y_L$ | $Y_M$ |
|  | 4 | $X_S$ | $X_L$ | R | $X_M$ | $Y_M$ |
|  | 5 | $X_S$ | $Y_S$ | R | $Y_L$ | $Y_M$ |
| sm2 | 6 | $Y_S$ | $X_S$ | Z | $Y_M$ | $X_M$ |
|  | 7 | $Y_S$ | $X_S$ | R | $Y_M$ | $X_M$ |
|  | 8 | $Y_S$ | $Y_L$ | R | $X_L$ | $X_M$ |
|  | 9 | $Y_S$ | $Y_L$ | R | $Y_M$ | $X_M$ |
|  | 10 | $Y_S$ | $X_S$ | R | $X_L$ | $X_M$ |

According to Table 8, five kinds per sector mode, totally ten kinds of combinations of selection vectors are present. Tables 3 through 6 indicate that all of the selection vectors are expanded for each of the input and output sectors.

The duties of the switching patterns obtained from sector modes 1 and 2 are uniquely determined as shown in Table 9.

TABLE 9

DUTY FACTOR CONVERSION TABLE (PROPOSED METHOD II)

| selection pattern | input sector | duty factor (indirect-to-direct conversion) | | | | |
| --- | --- | --- | --- | --- | --- | --- |
|  |  | d1 (v1) | d2 (v2) | d3 (v3) | d4 (v4) | d5 (v5) |
| 1 | odd | C | D | Z − C − D | A + C | B + D |
|  | even | A | B | Z − A − B | A + C | B + D |
| 2 | odd | C | Z − C | C + D − Z | Z + A − D | B + D |
|  | even | A | Z − A | A + B − Z | Z + C − B | B + D |
| 3 | odd | Z | C − Z | Z + A | D − A − Z | I − C − D |
|  | even | Z | A − Z | Z + C | B − C − Z | I − A − B |
| 4 | odd | Z | C − Z | D | Z + A − D | B + D |
|  | even | Z | A − Z | B | Z + C − B | B + D |
| 5 | odd | C | Z − C | A + C | D − A − Z | I − C − D |
|  | even | A | Z − A | A + C | B − C − Z | I − A − B |
| 6 | odd | D | C | Z − C − D | B + D | A + C |
|  | even | B | A | Z − A − B | B + D | A + C |
| 7 | odd | D | Z − D | C + D − Z | Z + B − C | A + C |
|  | even | B | Z − B | A + B − Z | Z + D − A | A + C |
| 8 | odd | Z | D − Z | Z + B | C − B − Z | I − C − D |
|  | even | Z | B − Z | Z + D | A − D − Z | I − A − B |

TABLE 9-continued

DUTY FACTOR CONVERSION TABLE
(PROPOSED METHOD II)

| selection pattern | input sector | duty factor (indirect-to-direct conversion) | | | | |
|---|---|---|---|---|---|---|
| | | d1 (v1) | d2 (v2) | d3 (v3) | d4 (v4) | d5 (v5) |
| 9 | odd | Z | D − Z | C | Z + B − C | A + C |
| | even | Z | B − Z | A | Z + D − A | A + C |
| 10 | odd | D | Z − D | B + D | C − B − Z | I − C − D |
| | even | B | Z − B | B + D | A − D − Z | I − A − B |

The selection patterns 1 through 10 of Table 9 correspond to selection patterns shown in FIG. 8. If the sector mode is sector mode 1, the duties of the corresponding vectors are in selection patterns 1 through 5. If the sector mode is sector mode 2, the duties of the corresponding vectors are in selection patterns 6 through 10. As appreciated from Table 9, the duties described above can be expressed in the additions and subtractions of the duties obtained in the virtual indirect conversion duties.

The input and output voltage waveforms and input and output current waveforms when this technique is used are as shown in FIG. 13. FIG. 13(*a*) shows results when an output voltage command value is low and FIG. 13(*b*) shows results when the output voltage command value is high. Each of FIGS. 13(*a*) and 13(*b*) indicate the power source phase voltage, the input current, the output line voltage, and the output current in a sequence from an upper position thereof.

Second Embodiment

In this embodiment, the updating of the switching patterns and duties is carried out in the following way. If the switching patterns are changed when the input sector is changed by +1 or the output sector is changed by ±1 and the switching patterns are changed, either one of an initial value (the switching pattern to be outputted in a vicinity to a lower side vertices of the carrier) of the corresponding switching pattern and a final value thereof (the switching pattern to be outputted in a vicinity to an upper side vertex of the carrier) is always the same pattern.

Therefore, in a case where the switches connected to the output phases when the switching pattern is updated are changed, the updating described above is stopped and a previous pattern is latched and is again outputted. Then, if the switch change when the switching pattern is updated is prevented by updating the switching pattern which has not been updated at a previous time at one of the vertices of the subsequent triangular wave. It should be noted that, in a case where the input sectors and the output sectors are simultaneously changed or in a case where the sectors are changed by ±2 or more, the switch change is allowed and an immediate switch change at one of the vertices is carried out.

EXPLANATION OF SIGNS

Figure 1:
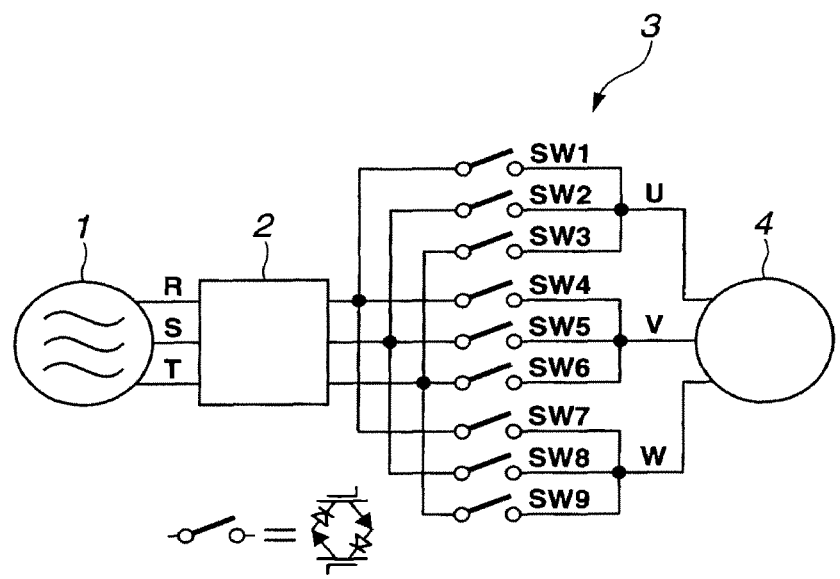
FIG. 1 a basic configuration view of a matrix converter to which the present invention is applicable.
Figure 2:
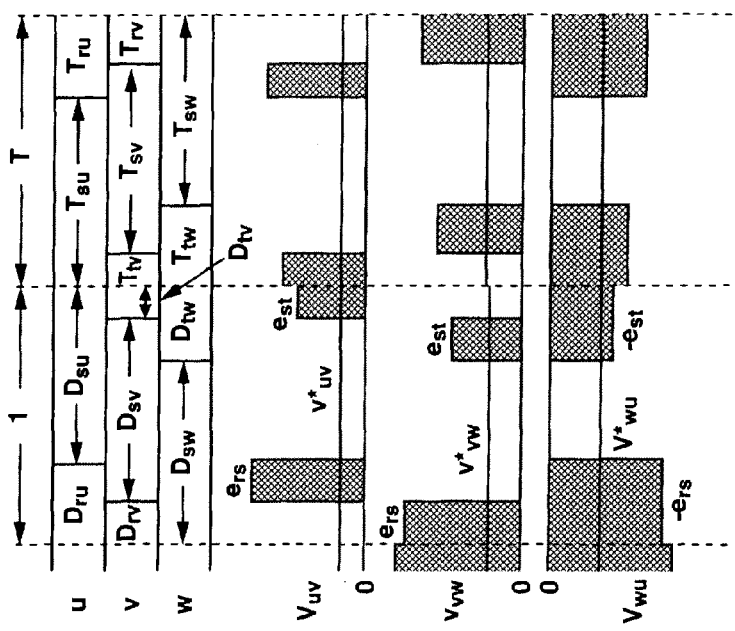
FIG. 2 an explanatory view illustrating examples of switching patterns and an output voltage through a conventional method.
Figure 2:
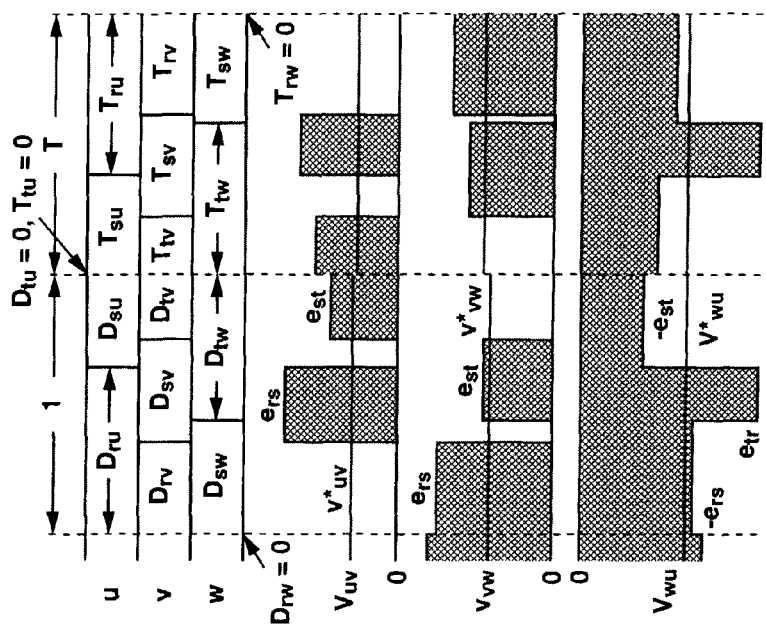
Figure 3:
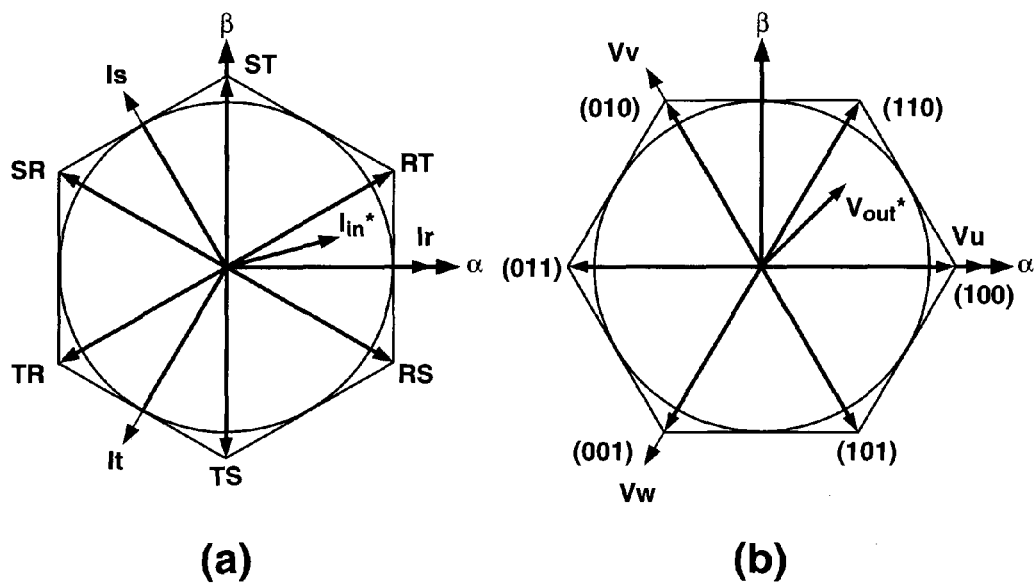
FIG. 3 representations of space vectors, Fig. (a) of 3 being an input virtual rectifier space vector diagram and Fig. (b) of 3 being an output virtual space vector diagram.
Figure 4:
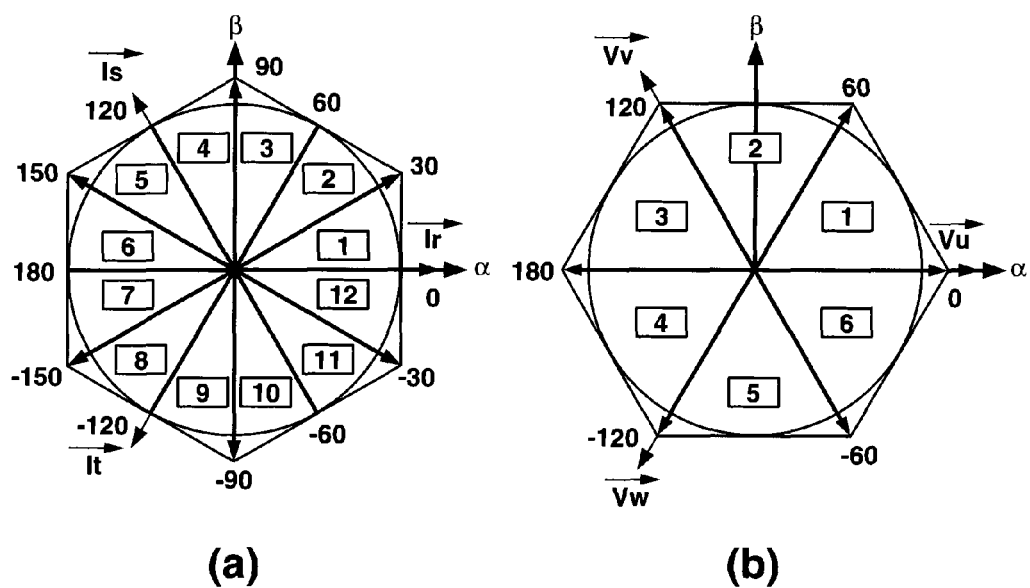
FIG. 4 explanatory views of definition examples of an input side sector and an output side sector of the space vector.
Figure 5:
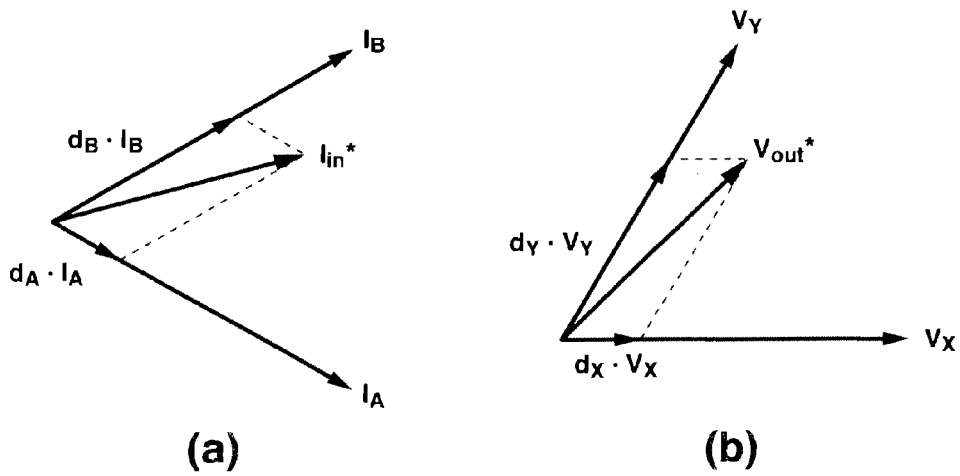
FIG. 5 diagrams of an input current command vector and an output voltage command vector.
Figure 6:
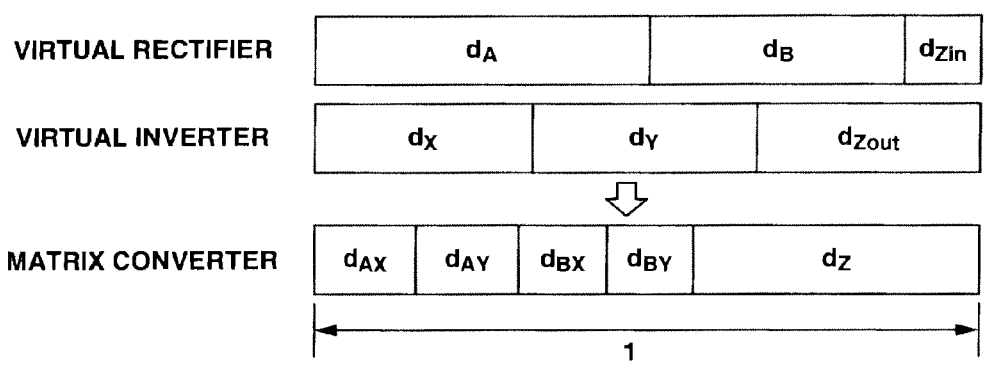
FIG. 6 an explanatory view representing a relationship between base vectors and duties for these vectors.
Figure 7:
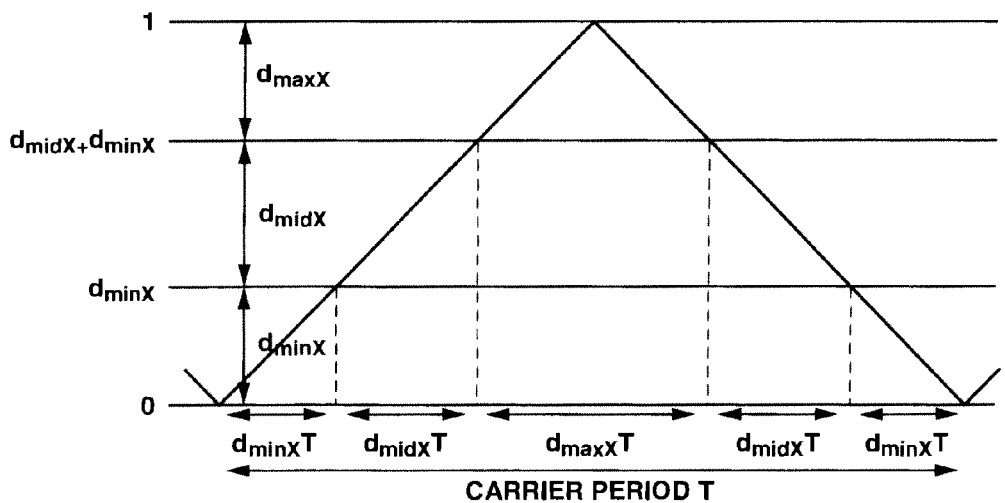
FIG. 7 an explanatory view representing a pattern of the carrier comparison in a conventional example.
Figure 8:
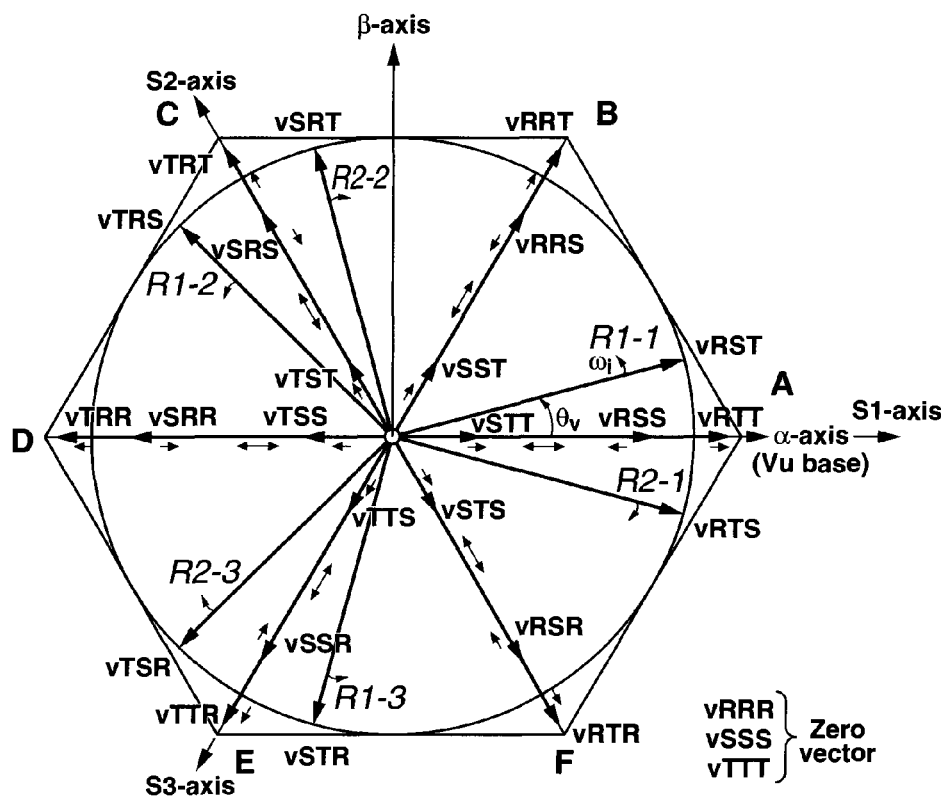
FIG. 8 an output voltage space vector diagram when an input phase voltage phase of the matrix converter is 15 degrees.
Figure 9:
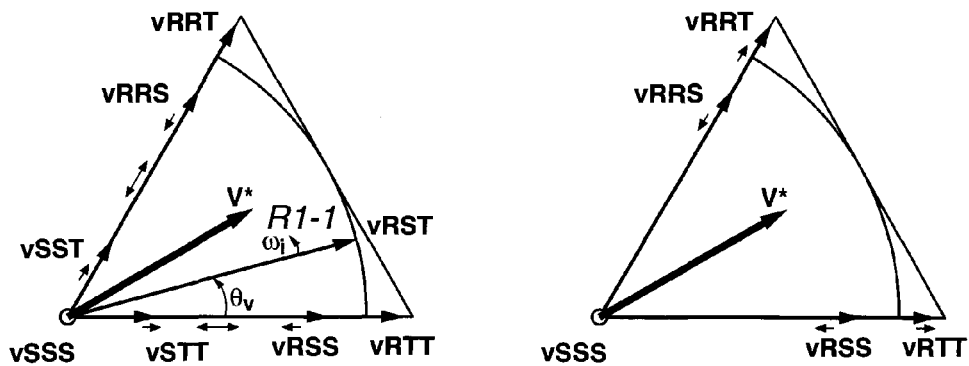
FIG. 9 vector diagrams in a sector 1 region in FIG. 8.
Figure 10:
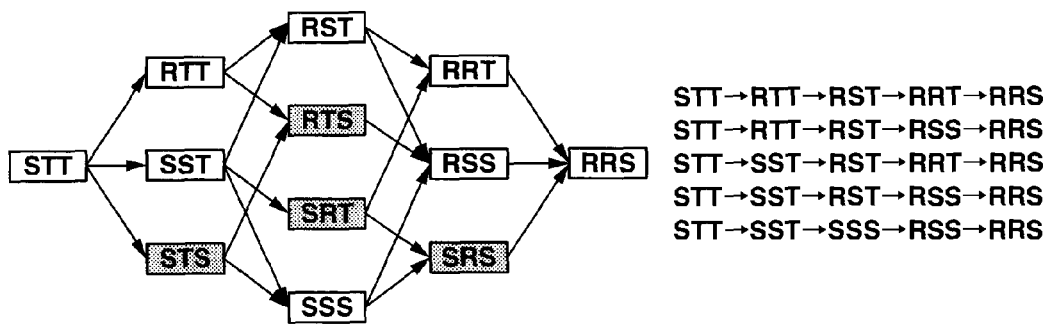
FIG. 10 an explanatory view of a switching pattern satisfying a condition according to the present invention.
Figure 11:
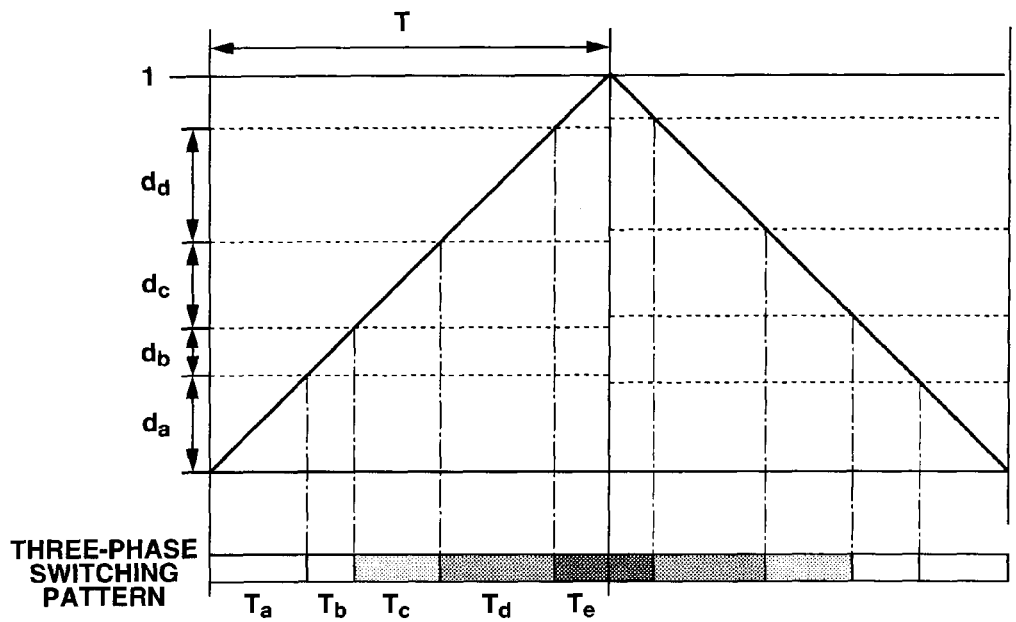
FIG. 11 an explanatory view representing a pattern of the carrier comparison according to the present invention.
Figure 12:
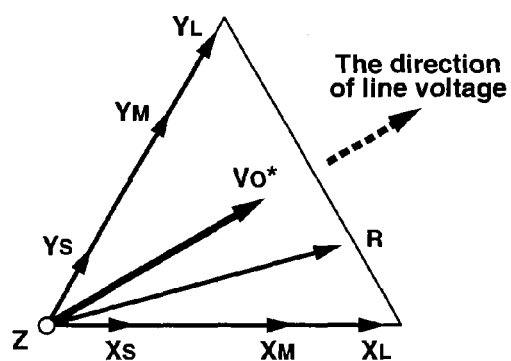
FIG. 12 a vector diagram in one sector.
Figure 13:
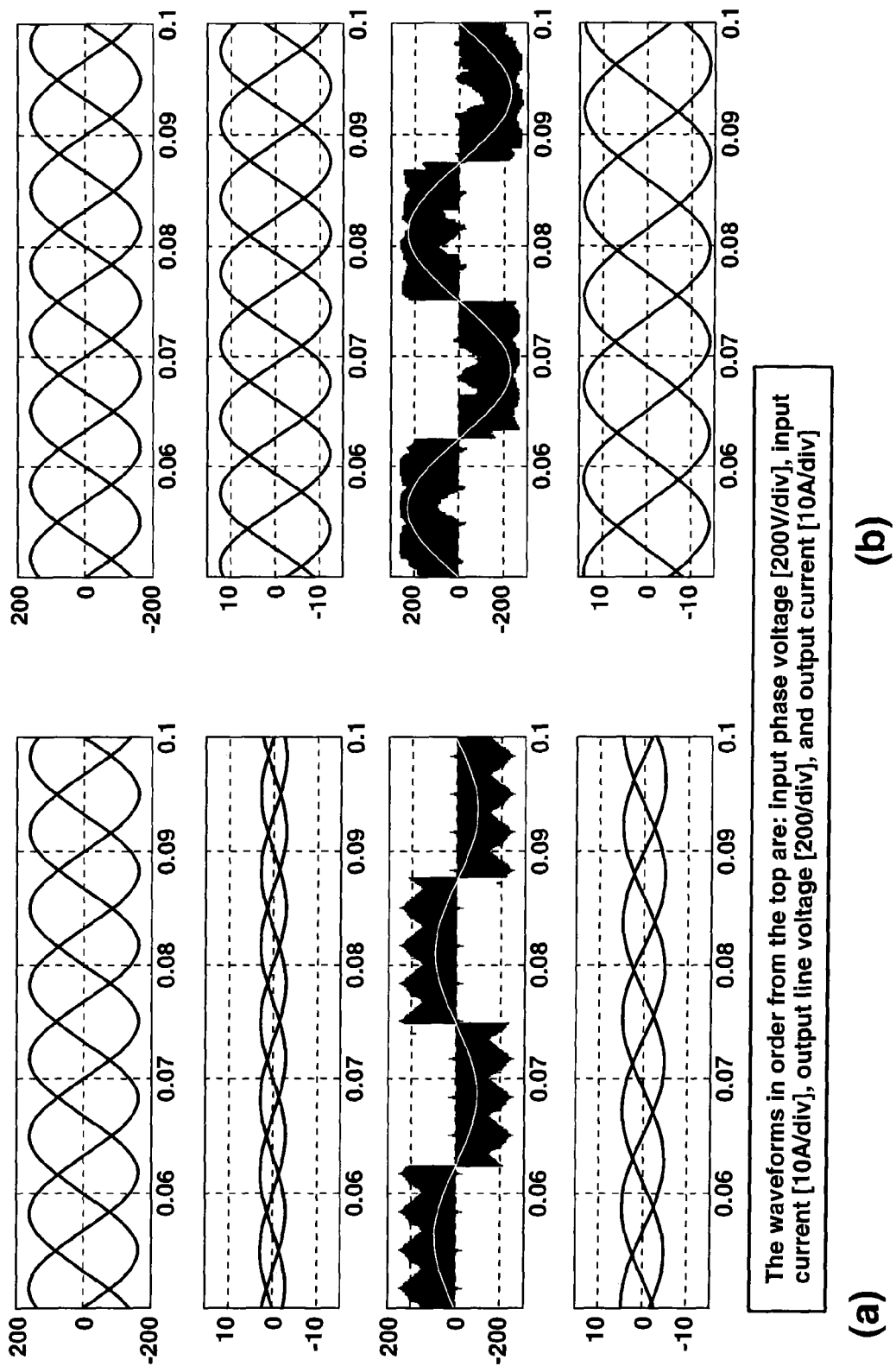
FIG. 13 input and output voltage and current waveform charts when a control according to the present invention is carried out.

1 ... three-phase AC power source 2 ... input filter section 3 ... semiconductor power conversion section 4 ... load.

The invention claimed is:

1. A matrix converter space vector modulation method in which bidirectional switches of a matrix converter are PWM controlled in a space vector modulation, comprising:
   supposing line voltages of a multi-phase AC output to be states of vectors expanded on two-phase stationary αβ axes;
   defining a simple harmonic oscillation vector axis whose phase in a sector in which an output voltage command value V*o is present is retarded as X axis and the simple harmonic oscillation axis whose phase in the sector is advanced as Y axis;
   supposing maximum vectors $X_L$, $Y_L$, middle vectors $X_M, Y_M$, and minimum vectors $X_S, Y_S$ on the respective axes, a zero vector Z which provides a middle voltage of phase voltages, and a rotation vector R which is present singly in the sector, to be eight base vectors;
   converting switching patterns for which virtual indirect space vectors are used into other switching patterns for which direct conversion space vectors constituted by a combination of five vectors among the eight base vectors are used;
   selecting any one of the converted switching patterns which satisfies predetermined conditions to reduce harmonics of an input current of the matrix converter and/or an output voltage thereof;
   calculating duties of the five space vectors which make a transit in the selected switching pattern from duty relationship equations between the virtual indirect space vectors and the direct conversion space vectors; and
   performing the PWM control for the bidirectional switches on a basis of the calculated duties.

2. The matrix converter space vector modulation method as claimed in claim 1, wherein the predetermined conditions include a condition that an input minimum voltage phase is not connected to a maximum voltage phase of an output voltage command and an input maximum voltage phase is not connected to a minimum voltage phase of the output voltage phase and another condition that changes of input phases to be connected to output phases from the maximum voltage phase to the minimum voltage phase and from the minimum voltage phase to the maximum voltage phase are inhibited.

3. The matrix converter space vector modulation method as claimed in claim 1, wherein the calculation of the duties is carried out using a table in which the duties corresponding to the switching pattern for which the direct conversion five space vectors are used are expressed in terms of the duties to be applied to the switching pattern for which the virtual indirect space vectors are used.

4. The matrix converter space vector modulation method as claimed in claim 1, wherein, in a case where, when a region constituted by the output voltage command value vector and simple harmonic oscillation vectors enclosing the output voltage command value vector is defined as a sector, the switching pattern is changed into an adjacent sector at either an input side or an output side, the switching pattern is not updated.

5. The matrix converter space vector modulation method as claimed in claim 2, wherein the calculation of the duties is carried out using a table in which the duties corresponding to the switching pattern for which the direct conversion five space vectors are used are expressed in terms of the duties to be applied to the switching pattern for which the virtual indirect space vectors are used.

6. The matrix converter space vector modulation method as claimed in claim 2, wherein, in a case where, when a region constituted by the output voltage command value vector and simple harmonic oscillation vectors enclosing the output voltage command value vector is defined as a sector, the switching pattern is changed into an adjacent sector at either an input side or an output side, the switching pattern is not updated.

7. The matrix converter space vector modulation method as claimed in claim 3, wherein, in a case where, when a region constituted by the output voltage command value vector and simple harmonic oscillation vectors enclosing the output voltage command value vector is defined as a sector, the switching pattern is changed into an adjacent sector at either an input side or an output side, the switching pattern is not updated.

8. The matrix converter space vector modulation method as claimed in claim 3, wherein the duties corresponding to the switching pattern for which the direct conversion five space vectors are used are expressed in the table as additions or subtractions of the duties to be applied to the switching pattern for which the virtual indirect space vectors are used.

9. The matrix converter space vector modulation method as claimed in claim 5, wherein the duties corresponding to the switching pattern for which the direct conversion five space vectors are used are expressed in the table as additions or subtractions of the duties to be applied to the switching pattern for which the virtual indirect space vectors are used.

10. The matrix converter space vector modulation method as claimed in claim 7, wherein the duties corresponding to the switching pattern for which the direct conversion five space vectors are used are expressed in the table as additions or subtractions of the duties to be applied to the switching pattern for which the virtual indirect space vectors are used.

* * * * *